(12) United States Patent
Klingman

(10) Patent No.: US 6,789,212 B1
(45) Date of Patent: Sep. 7, 2004

(54) BASIC CELL FOR N-DIMENSIONAL SELF-HEALING ARRAYS

(76) Inventor: Edwin E. Klingman, 3000 Hwy. 84, San Gregorio, CA (US) 94074

( * ) Notice: Subject to any disclaimer, the term of this patent is extended or adjusted under 35 U.S.C. 154(b) by 0 days.

(21) Appl. No.: 09/531,911

(22) Filed: Mar. 20, 2000

Related U.S. Application Data

(63) Continuation-in-part of application No. 09/443,944, filed on Nov. 19, 1999, which is a continuation-in-part of application No. 09/339,010, filed on Jun. 23, 1999, which is a continuation-in-part of application No. 09/303,010, filed on Apr. 30, 1999, which is a continuation-in-part of application No. 08/925,991, filed on Sep. 9, 1997, now Pat. No. 6,021,453, which is a continuation-in-part of application No. 08/846,118, filed on Apr. 24, 1997, now Pat. No. 5,860,021.

(60) Provisional application No. 60/131,717, filed on Apr. 30, 1999.

(51) Int. Cl.[7] .............................................. G06F 11/00
(52) U.S. Cl. ................................. 714/9; 714/3; 714/12
(58) Field of Search ................................ 714/8, 5, 3, 9; 712/15, 13

(56) References Cited

U.S. PATENT DOCUMENTS

| | | | |
|---|---|---|---|
| 4,533,993 A | 8/1985 | McCanny et al. ............. 712/28 |
| 4,604,683 A | 8/1986 | Russ et al. .................. 395/280 |
| 5,151,996 A | 9/1992 | Hillis ........................... 712/16 |
| 5,203,005 A | * 4/1993 | Horst .......................... 712/15 |
| 5,291,609 A | 3/1994 | Herz ........................... 395/726 |
| 5,394,544 A | 2/1995 | Motoyama et al. ............. 714/38 |
| 5,497,373 A | 3/1996 | Hulen et al. .................. 370/259 |
| 5,530,894 A | 6/1996 | Farrell et al. ................. 395/200 |
| 5,537,654 A | 7/1996 | Bedingfield et al. ........ 395/837 |
| 5,568,621 A | * 10/1996 | Wooten ....................... 710/112 |
| 5,574,861 A | 11/1996 | Lorvig et al. ................. 395/200 |
| 5,621,900 A | * 4/1997 | Lane et al. ................... 710/120 |
| 5,663,950 A | * 9/1997 | Lee et al. .................... 370/224 |
| 5,682,328 A | 10/1997 | Roeber et al. ................ 714/39 |
| 5,682,552 A | 10/1997 | Kuboki et al. ............... 395/872 |
| 5,687,346 A | 11/1997 | Shinohara .................... 395/430 |
| 5,710,932 A | 1/1998 | Hamanaka et al. ........... 712/11 |
| 5,715,411 A | 2/1998 | Verdun ........................ 710/107 |
| 5,754,792 A | 5/1998 | Shutoh et al. ............... 709/243 |
| 5,790,810 A | * 8/1998 | Kaba ........................... 710/104 |
| 5,790,879 A | 8/1998 | Wu .............................. 712/18 |
| 5,801,715 A | 9/1998 | Norman ...................... 345/505 |
| 5,802,325 A | 9/1998 | Le Roux ..................... 395/282 |
| 5,815,723 A | * 9/1998 | Wilkinson et al. ........... 712/20 |
| 5,822,548 A | 10/1998 | Story et al. .................. 395/286 |
| 5,822,608 A | 10/1998 | Dieffenderfer et al. ....... 712/11 |
| 5,832,245 A | 11/1998 | Gulick ......................... 395/309 |
| 5,857,084 A | 1/1999 | Klein ........................... 710/305 |
| 5,935,223 A | 8/1999 | Griffith et al. ................ 710/36 |
| 6,035,354 A | 3/2000 | Klein ........................... 710/303 |

* cited by examiner

*Primary Examiner*—Nadeem Iqbal
*Assistant Examiner*—Timothy M Bonura
(74) *Attorney, Agent, or Firm*—Anthony B. Diepenbrock, III; Dechert LLP

(57) ABSTRACT

A system is described capable of excising individual cells in an N-dimensional array and healing the array connectivity without manual intervention. Thus cells that fail can be deleted and the array remain viable, although possibly requiring re-synchronization procedures to be performed. The system allows either replacement of bad cells or bypassing of bad cells, with appropriate cost and operational differences. Both level sensitive and edge sensitive excision mechanisms are described and the consequences of each discussed. The invention applies to processor arrays with one cell per physical chip or many cells per chip, and handles uni-directional or bi-directional data flows, and is generally both interface independent and technology independent.

44 Claims, 13 Drawing Sheets

BASIC CELL FOR N-DIMENSIONAL SELF-HEALING ARRAYS

CROSS REFERENCE TO RELATED APPLICATIONS

This patent is a continuation in part of prior U.S. application Ser. No. 09/443,944, filed Nov. 19, 1999, and entitled "Adaptation of Standard Microprocessor Architectures Via An Interface to a Configurable Subsystem," now U.S. Pat. No. 6,584,525, which is a continuation in part of a prior application Ser. No. 09/339,010, filed Jun. 23, 1999 and entitled "A Single Stepping System and Method for Tightly Coupled Processors," now U.S. Pat. No. 6,425,122, which is a continuation in part of a prior application Ser. No. 09/303,010, filed Apr. 30, 1999 and entitled "An Integrated Breakpoint System and Method For Tightly Coupled Processors, And Capable of Supporting a Chain of Processors," which is a continuation in part of a prior application Ser. No. 08/925,991, filed Sep. 9, 1997, and entitled "A Microprocessor Unit for Use in an Indefinitely Extensible Chain of Processors with Self-Propagation of Code and Data from the Host End, Self-Determination of Chain Length and ID, (and with Multiple Orthogonal Channels and Co-ordination Ports)," now U.S. Pat. No. 6,021,453, which is also a continuation in part of a prior application Ser. No. 08/846,118 filed Apr. 24, 1997, now U.S. Pat. No. 5,860,021, entitled "Single Chip Micro-Controller having Down-Loadable Memory Organization supporting "Shadow" Personality, Optimized for Bi-Directional Data Transfers over a Communications Channel," all of which applications are incorporated herein by reference; and this application is related to PCT application U.S. Ser. No. 98/08224, filed Apr. 23, 1998, entitled "Single Chip Micro-Controller having Down-Loadable Memory Organization supporting "Shadow" Personality, Optimized for Bi-Directional Data Transfers over a Communications Channel," and U.S. Provisional Patent Application Ser. No. 60/131,717, filed Apr. 30, 1999, and entitled "A System of Tightly Coupled Macro-Instructions Between a Host Computer and a Micro Controller Peripheral, with extension to peripheral Chains."

BACKGROUND

1. Field of Invention

The present invention relates generally to repairable processor arrays and more particularly to an automatically repairable chain of processors.

2. Description of Related Art

Multi-processor arrays may possess millions, possibly even billions of transistors. With such huge numbers the likelihood of individual transistors failing may be non-negligible.

Clearly it is not acceptable to replace the entire array of processors, and, in many cases, it is not feasible even to replace an individual processor or element of the system, particularly if the processor that fails is part of an array of many processors implemented on a single substrate. Therefore, a means of detecting failure and taking some corrective action becomes increasingly important.

Multi-processor arrays have been built since the 1970's, generally with large numbers of very simple processors. Today technology offers many ways to implement many processors on a chip. It is expensive to manually replace single processor chips, particularly chips with hundreds of pins, and particularly ball grid array (BGA) surface-mounted packaging. Thus extreme efforts are made to detect any failure during manufacturing and qualification. For example, 'full-scan' testing procedures build test circuitry into every register, almost the most expensive approach conceivable. Such circuitry allows every register to be tested for 'stuck' faults, those occurring when a normally two-state system insists on remaining stuck at one state. The tests are performed at various stages of manufacture, typically near packaging of the chips. The farther along in manufacturing, the more expensive things become, so every effort is made to delete failures as early as possible. By the time the system is deployed, failures have reached their maximum cost level. Manually repairing or replacing such components is prohibitively expensive.

SUMMARY OF THE INVENTION

A method of testing for faults, excising such faults, and re-connecting an otherwise broken array of cells, is described with examples presented in terms of the basic cell architecture supporting cell excision and net healing. A cell replacement mechanism is developed, and the limiting cases of 100% and 0% replacement are considered along with associated costs. Thus the system allows either replacement of bad cells or bypassing of bad cells, with appropriate cost and operational differences. Both level sensitive and edge sensitive excision mechanisms are described and the consequences of each discussed. The invention applies to processor arrays with one cell per physical chip or many cells per chip, and handles uni-directional or bi-directional data flows. Limiting cases of all uni-directional busses and all bi-directional busses are treated. The invention is generally both interface independent and technology independent. The extension to N-dimensional is developed with the case of 2-space diagrammatically presented.

An object of the invention is to repair a chain of processing elements, as shown in FIG. 1, without having to manually reconfigure the chain. This is traded off against the minimal cost of the associated circuitry described herein, and the software recovery procedures necessary to synchronize operation of the healed chain. It may also be traded off against 'full scan' tests.

An apparatus in accordance with the present invention includes (i) a processing, cell having an upstream interface and a downstream interface, where the processing cell performs processing operations of the extended processor element; and (ii) bypass circuitry, for bypassing the processing cell, connected to at least one select line to receive a select signal and connected between the extended upstream interface and said cell upstream interface and between the extended downstream interface and cell downstream interface, where said bypass circuitry is operative to connect the extended upstream interface to the extended downstream interface in response to an active select signal, and to connect said cell upstream interface to the extended upstream interface and said cell downstream interface to the extended downstream interface in response to an inactive select signal.

In a chain of extended processing elements, where each element has a processing unit for carrying out the processing operations of the extended processing element, and bypass circuitry to connect the processing unit to an extended upstream interface and an extended downstream interface of the extended processing element when the bypass circuitry is not activated, and to connect the extended upstream interface to the extended downstream interface when the bypass circuitry is activated, the chain being formed by connecting upstream and downstream interfaces to each other, a method, in accordance with the present invention, includes (i) receiving information indicating that testing is required of the upstream processor element; testing the upstream processor element to determine whether said cell of the upstream element responds correctly; and activating the upstream processor element bypass circuitry to connect the upstream interface to the downstream interface of the upstream processor element if the upstream processor element does not respond correctly.

An advantage of the present invention is that a physical processor chain can be "healed" without having to manually excise the failed cell and manually repair the break. This advantage leads to savings in time and cost of manually repairing a broken chain.

Another advantage is that a chain can be reconfigured by excising some elements and restoring other elements as needed for a particular processing task. This advantage leads to a savings in power if unneeded elements are powered down.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE PREFERRED EMBODIMENTS

Figure 1A:
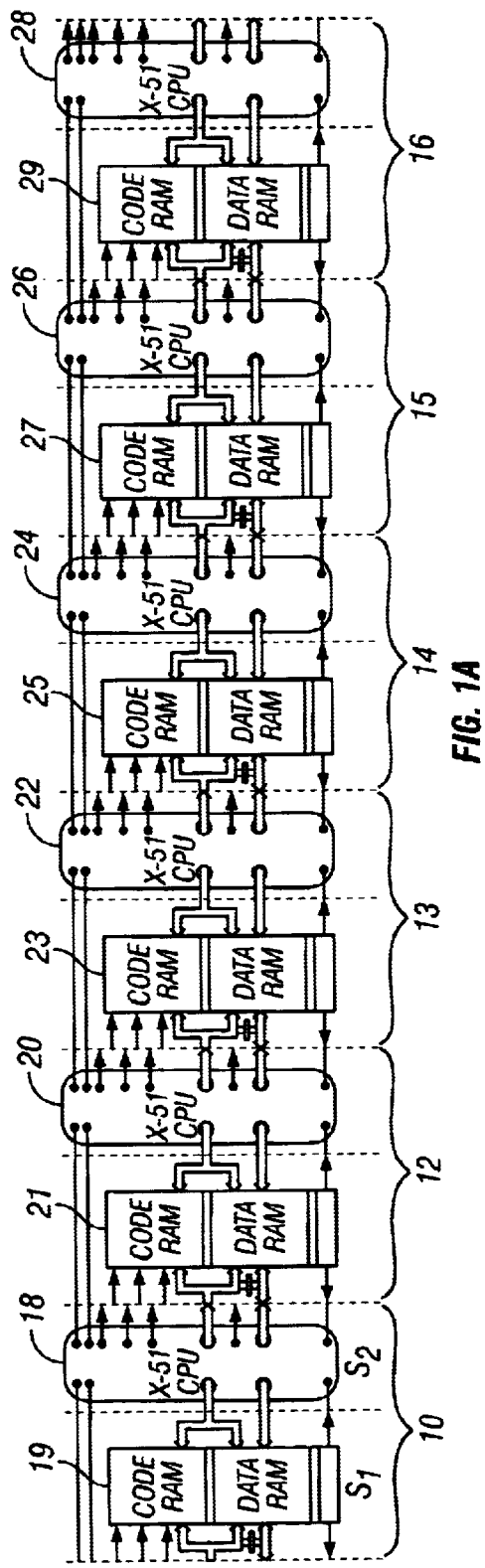
FIGS. 1A and 1B depict a multi-processor chain with identical inter-chain interfaces.
Figure 1B:
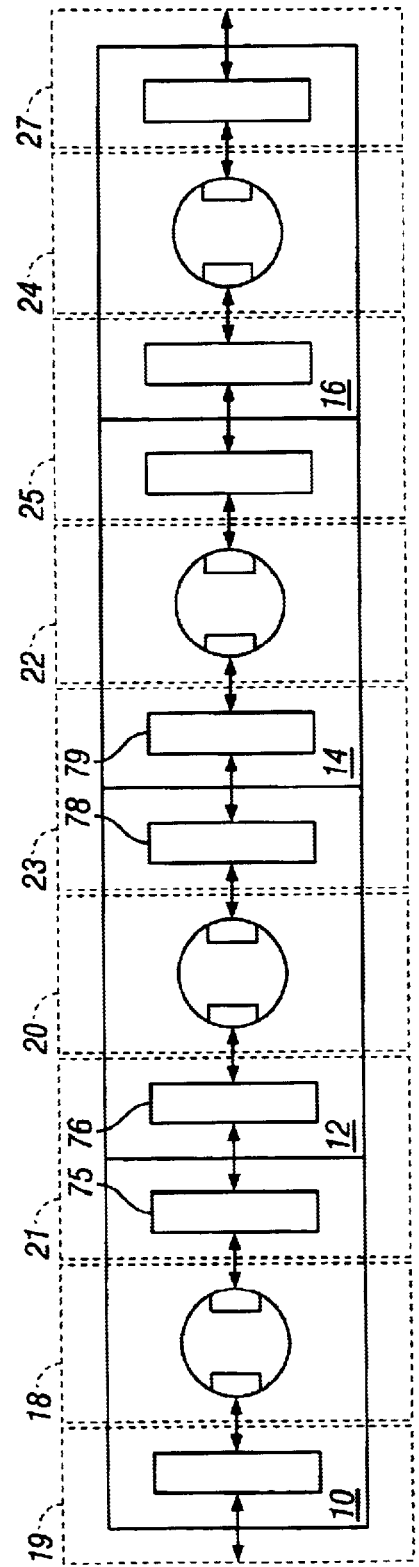

A necessary element of self-healing in a cell network is the ability to excise damaged cells and re-connect the cell network to preserve its integrity. The cell network or cell array topology of FIG. 1A implies an iterative sequence of processor elements 10, 12, 13, 14, 15, 16, which include processing cells 18, 20, 22, 24, 26, 28 and interfaces 19, 21, 23, 25, 27, and 29. This implies a dual space consisting of an iterative sequence of interfaces joined by intervening processing cells as shown in FIG. 1A. FIG. 1B shows a more conceptual view of the elements in FIG. 1A in which each processing cell 18, 20, 22, 24 is connected to an upstream interface and a downstream interface. For example, for processing cell 20, upstream interface 76 connects to the downstream interface 75 of the adjacent upstream cell 18 and downstream interface 78 connects to the upstream interface 79 of the adjacent downstream cell 22.

Figure 2A:
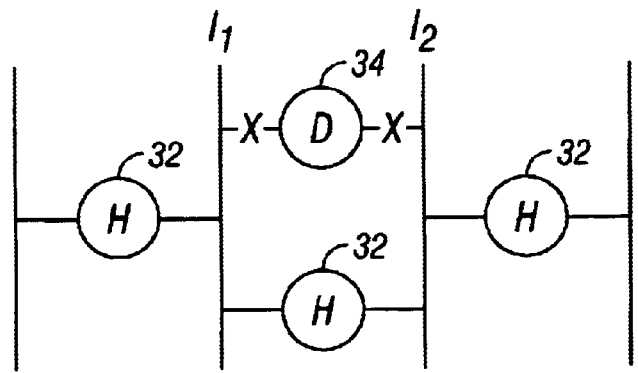
FIG. 2A depicts a healthy cell H replacing an excised diseased cell D.
Figure 2B:
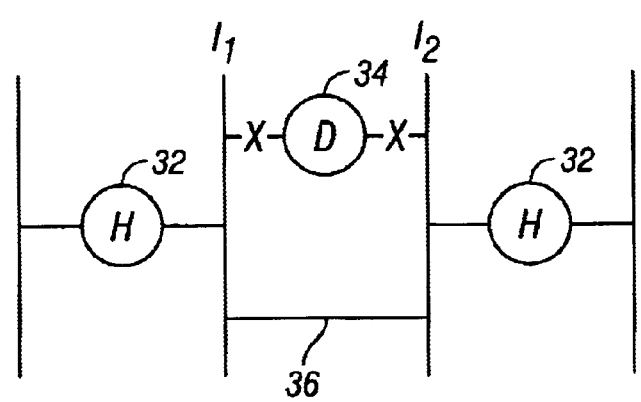
FIG. 2B depicts a direct connection maintaining array connectivity after a damaged cell has been excised from an array.

When a cell is excised from an array, the connectivity between the two neighboring interfaces must be restored. These limiting cases are shown in FIGS. 2A and 2B. FIG. 2A shows the case in which the excised cell is replaced by a healthy cell, and FIG. 2B shows a direct connection bypassing the excised cell. In the one case, in FIG. 2A, this involves switching in a healthy cell 32 to replace the excised cell 34. In the other case, in FIG. 2B, this involves making a direct connection 36 between the neighboring interface, thus bypassing the excised cell 34.

The present invention is compatible with either of these two limiting cases, however the costs involved strongly favor the direct connection in most situations.

As shown in FIG. 2A, the case in which a healthy cell replaces a diseased cell requires the availability of both a healthy cell (per cell) 32 and also the replacement subsystem (not shown). Assume, for accounting purposes, a cell of 100,000 gates. If, for each cell in the array, a "spare" cell is required to support self-healing, the overhead is 100%, not including the replacement machinery, which is assumed to cost approximately 1000 gates per cell.

Applying these numbers to FIG. 2B, the relative costs change drastically. In the case of the direct connection, only the cost (in gates) of the replacement/reconnection circuit is added to the cell.

Thus, a solution employing healthy spare cells (per cell) doubles the cost of an array, while a direct connection approach adds only about 1% to the cost of the array. The direct connection approach is then the preferred embodiment.

The 100,000 gate cost per cell is based on a cell complexity approximately equal to that of a standard 8-bit microprocessor, while the re-connection circuitry includes primarily multiplexers, as described below. As each cell becomes more complex, the relative cost of self-healing decreases, and as each cell becomes less complex, the self-healing costs rise. In real terms, the cost of adding self-healing circuits based on direct re-connection is minimal, and most cellular arrays can be made self-healing economically.

ARRAY INTERFACES AND SELF-HEALING CIRCUITRY

The interface between two cells describes the signal flow between the cells at every point on the interface. In the simplest case, data flow at every point on the interface is uni-directional, that is, signals always flow in the same direction at that point. To define direction we assume a linear array in one dimension, although our invention can support any number of orthogonal array dimensions, as described later. Note that a multi-dimensional array of cells may support different interfaces in different dimensions. (See U.S. Pat. No. 6,021,453, which disclosure is expressly incorporated herein by reference.)

Figure 3:
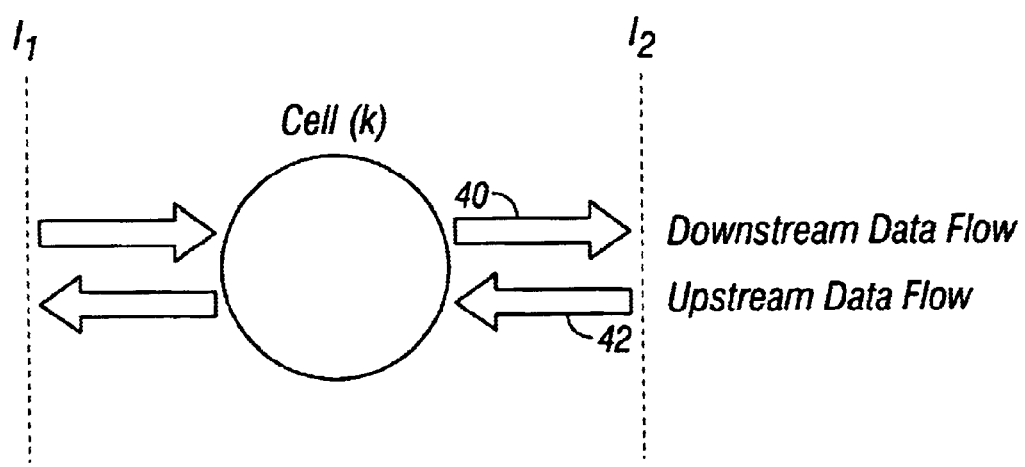
FIG. 3 shows an cell interface defined entirely in terms of uni-directional data flows.

By limiting the discussion to one dimension at a time, the direction flow is limited to two directions, an "upstream" 42 and a "downstream" direction 40 as shown in the one-dimensional cross section of a linear array of cells in FIG. 3. An interface may be symmetrical in both upstream and downstream directions, or asymmetrical. The present invention contemplates either case.

A SELF-HEALING CELLULAR SUBSYSTEM FOR UNI-DIRECTIONAL DATA PATH INTERFACES

Figure 4:
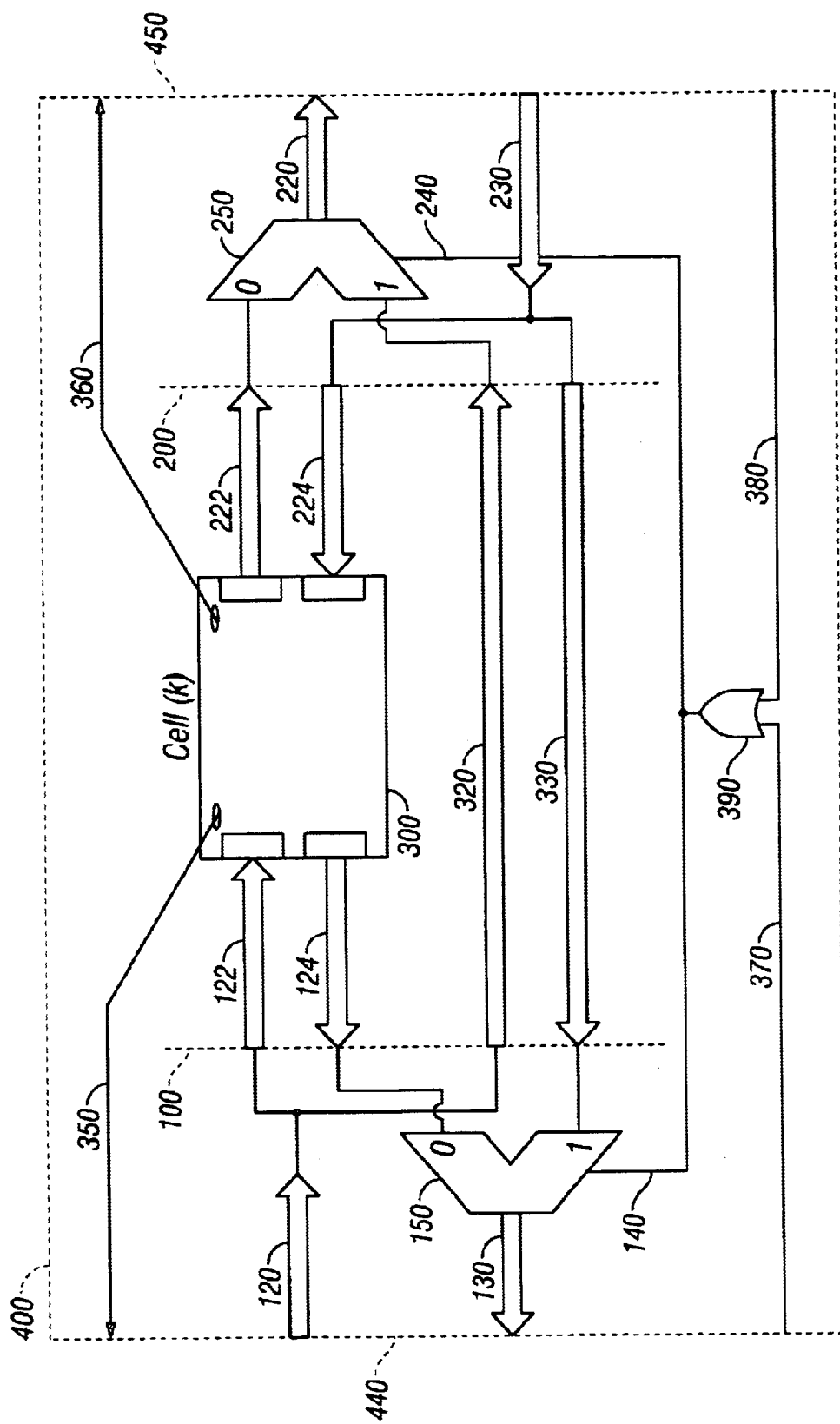
FIG. 4 depicts an extended processing element having unidirectional buses.

As shown in FIG. 4, the self-healing subsystem uses selector circuits of the type generically known as multiplexers, to select between data that derives from a given cell, and data that bypasses the given cell, as described below.

The basic cell 400 of the self-healing array contains the original cell[k] (i.e., processing unit) 300 plus the associated self-healing circuitry. The index, k, indicates that the cell is the $k^{th}$ cell in an arbitrary array of cells.

The original cell interfaces are shown as the cell upstream interface 100 and the cell downstream interface 200. Each of the interfaces is defined in identical fashion by the data flows across the interface. The cell upstream interface supports input bus 122 and output bus 124, while the cell downstream interface 200 supports output bus 222 and input bus 224. (The directions of input and output are relative to cell[k].) The composition, in terms of signals, is the same between buses 122 and 222 and between buses 124 and 224.

This last statement implies that the interface cannot distinguish between data flow on buses 122 and 222 or between data flow on buses 124 and 224. Thus if cell[k], for example, failed, in the sense of being unable to process the data flows as necessary, the data flow across cell upstream interface 100 is completely compatible with cell downstream interface 200. Therefore, the self-healing circuit can functionally excise the "damaged" cell and join the two previously separated interfaces, thereby preserving connectivity in this array dimension. To accomplish this, the original cell 300 is expanded to include the bypass circuitry shown in 400.

In particular, the preferred implementation uses the "fanout" properties of digital circuitry to "expand" data flow on bus 120 into two data flows, one on input bus 122, the original flow terminating at the original cell, and the other flow on bus 320, which bypasses original cell 300 and terminates at the cell downstream interface 200. Downstream of this downstream interface 200, bypass circuitry, which includes a multiplexer or data selector 250, is added, many implementations of which are well known to one skilled in the art. The function of a multiplexer is to receive data flows on multiple buses and select one flow for transmission. In FIG. 4, the multiplexer 250 receives output bus 222 from original cell[k] 300 and bus 320, which is identical to bus 122. The multiplexer is controlled by a "select" signal on signal line 240, which is discussed below. The signal on line 240 causes the multiplexer to transmit either input 222 or input 320 as output 220, which terminates at the extended downstream interface 450.

The symmetrically opposite data paths are derived from input bus 230, which crosses interface 450 and "fans out" into buses 224 and 330. Bus 224 terminates at the original cell[k] 300, and bus 330 terminates at an upstream multiplexer 150, into which bus 124 from cell[k] 300 also terminates. Multiplexer 150 is controlled by select signal on signal line 140, which is the fanout from signal line 390 and is identical to signal 240. Multiplexer 150 selects either data 124 or data 330 and re-transmits the selected data as bus 130, which terminates on the extended upstream interface 440.

The extended interfaces are equivalent to the original interfaces, except for the addition of two signals 350, 370 and 360, 380 to each interface. These additional signals are associated with selection of data flows. In particular, the extended upstream interface 440 is equivalent to cell upstream interface 100, except for the upstream selection output 350 and the upstream selection input 370, where in and out are defined to be relative to the cell. Similarly, the extended downstream interface 450 is equivalent to cell downstream interface 200 except for downstream selection output 360 and downstream selection input 380.

The default state of all selection signals is inactive (logical zero). Therefore, the default output of circuit 390 is zero, and, as seen from FIG. 4, a logical zero on the selection signal selects data from "0" side of each multiplexer 150, 250, which is the data from the cell[k] 300 for each multiplexer 150, 250. When 390 has a true signal on its output both multiplexers 150, 250 switch to the "1" data input, thereby bypassing cell[k] and electrically "excising" it from the circuit. This is the mechanism for excising a "diseased" cell, and for re-connecting the interfaces to the upstream and downstream array.

SELF-HEALING ALGORITHM

Recalling that FIG. 4 represents one of an array of identical cells connected (in each dimension) as a linear array or chain of processors, where each processor is in immediate communication with its upstream and downstream cellular neighbor across the extended upstream interface and extended downstream interface, respectively, the operation of excising a cell and reconnecting the chain is described next.

It is first assumed that the other cells in the array are the same as cell 400 so that an upstream interface such as interface 440 connects to a downstream interface such as interface 450, where an interface is upstream or downstream from the cell it pertains to. Included in the connections is an upstream selection output 350 of an upstream interface 440 which connects to a downstream selection input 380 of a downstream interface 450. Similarly, bus 220 of interface 450 is connected to bus 120 of interface 440 and bus 130 of interface 440 is connected to bus 230 of interface 450.

It is further assumed that meaningful communications occur between these adjacent cells, and that either cell can query, in some fashion, its immediate neighbor(s). For example, a set of test queries with known responses exists, by which each cell can query its neighbor and expect a known response. This allows the following procedure to be included in the preferred implementation.

Figure 5:
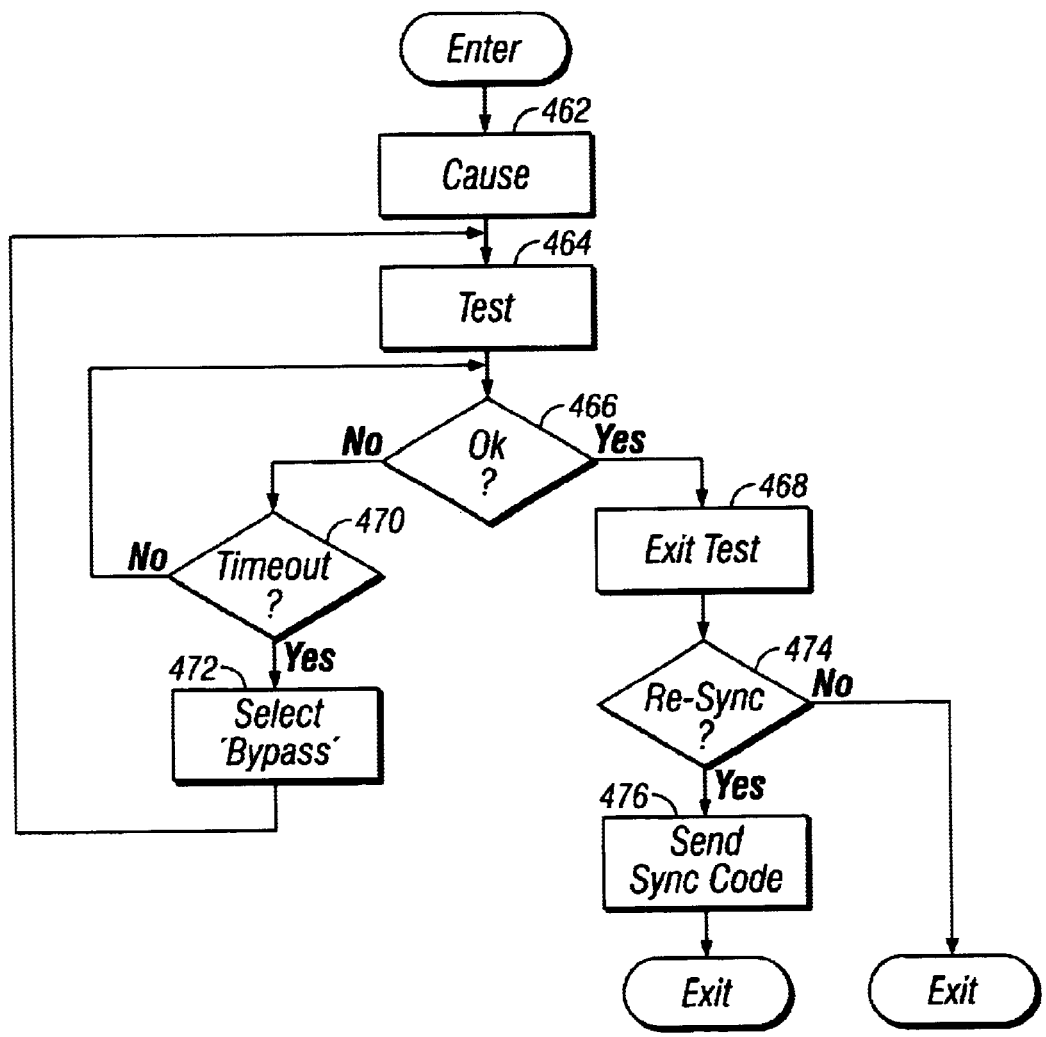
FIG. 5 shows the basic self-healing algorithm for a processor array.

Referring to FIG. 5, the procedure begins when the downstream cell queries its upstream neighbor using a test query 464 with a known response. This query is typically caused, in step 462, by either a command, a watchdog timer, or a detected error. After issuing the query to its upstream neighbor, say, the downstream cell waits, in step 464, for the appropriate known response. In a healthy circuit, this response occurs within a predetermined time period, and the downstream cell resumes normal operation, in step 468, until a future event causes a repeat of this procedure.

In the (unusual) event, in which the known response is not received within the predetermined time period or an erroneous response occurs within the time period, in step 470, the downstream cell may repeat the test, wait a little longer for the response, try a new test, or similarly attempt to communicate in known fashion with its upstream neighbor. In the worst case, all such attempts fail, and the downstream cell decides that the upstream cell has failed and represents a break in the communications chain, in step 472.

In this (failure) case, the downstream cell asserts its upstream selection output 350 (FIG. 4), which, as previously discussed, is connected to the downstream selection input 380 of the upstream cell. This signal enters circuit 390 and causes the selection signal 140, 240 to become a logical one. This signal, when applied to the selection port of multiplexers 150 and 250, causes the multiplexer to de-select the upstream cell and select the bypass paths 320 and 330, thereby connecting the extended upstream interface 440 to the extended downstream interface 450, effectively excising the failed cell while re-connecting the array. The excised cell's upstream neighbor is now in direct communication with its downstream neighbor.

Note that in some cases, depending upon cell addressing protocols, this requires a re-synchronization of array communications in steps 474 and 476 of FIG. 5 and a re-addressing procedure to recover from the excising operation and self-healing re-connection. In the general case, this is performed automatically, because the original cell that initiated the excision "knows" that it occurred, and informs its neighbor of that fact so that the cooperating survivors can make necessary adjustments.

The net effect is that the failure, during operations, of any such basic cell in the array of cells, which potentially "breaks" the array and destroys its original integrity, is managed, as described above, by an automatic procedure which heals the break and preserves end-to-end connectivity of the array, without requiring manual intervention—always a costly alternative.

BI-DIRECTIONAL VS. TWO UNI-DIRECTIONAL PATHS

The FIG. 3 depicts the case in which separate busses are used to carry signals upstream and downstream. In an alternative case, a bidirectional bus carries signals intone direction during certain times, and other directions at other times. This time-multiplexing of signal flow has the advantage of saving pins, since half as many pins are required by a bi-directional bus as by two directional busses (ignoring any necessary direction control pins).

Figure 6:
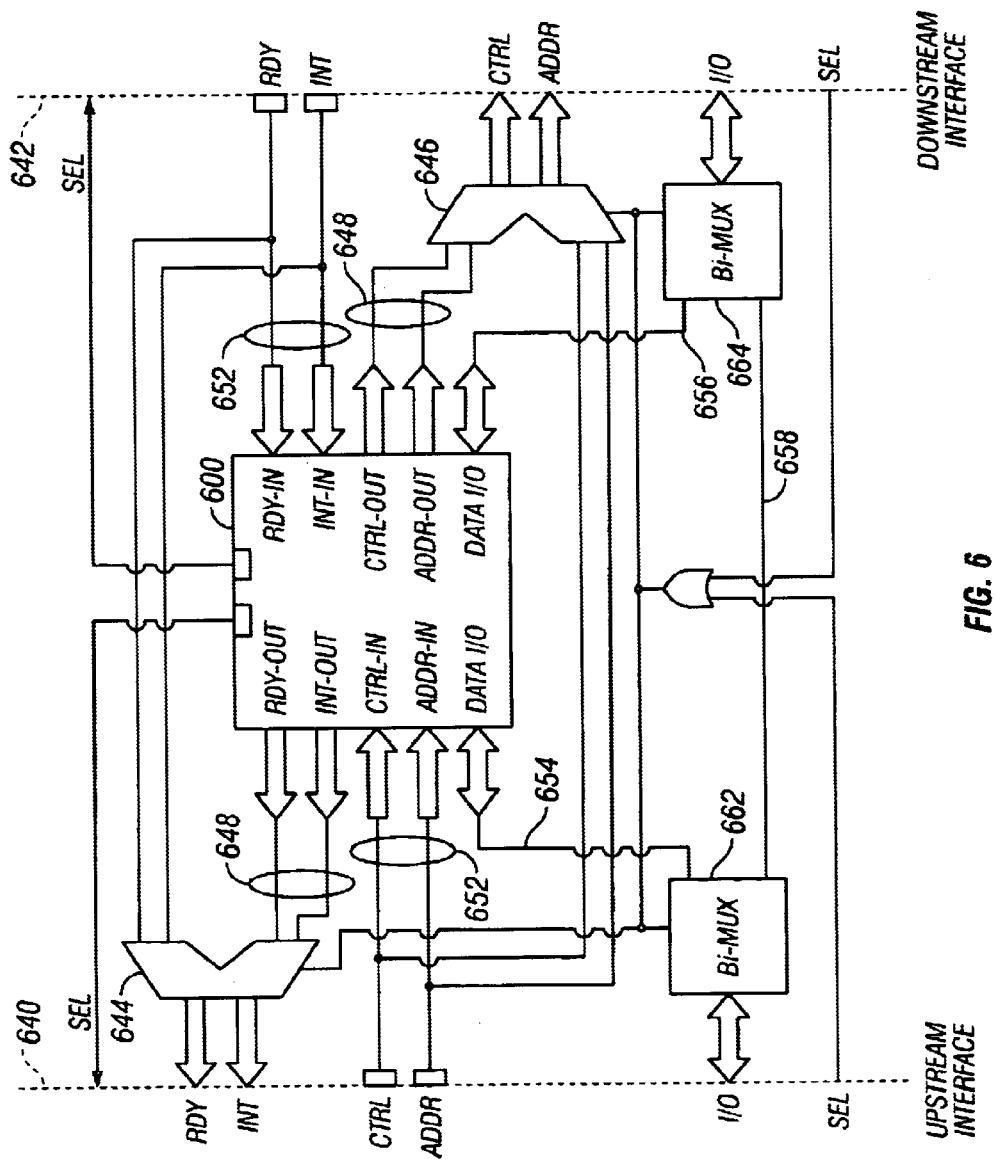
FIG. 6 shows the basic processor cell including bi-directional data flow paths.

Bidirectional buses, however, present the opportunity for driver conflicts, that is, two drivers attempting to drive the bus in "opposite" directions. This can result in a, "stronger" driver overcoming a "weaker" driver, non-logic level signals on the bus or the ultimate destruction of the opposing drivers. It is desirable to avoid driver conflicts and one typical way is the use of synchronized state machines, often employing direction control lines to control the bus. In some cases, if such lines exist, they are employed to switch between upstream multiplexers and downstream multiplexers (making sure the multiplexer still work after bypasses in place). FIG. 6 shows a typical cell with both unidirectional busses and bi-directional busses. The uni-directional busses are used for the address and control lines and the bi-directional busses are used for the data lines.

TECHNOLOGICAL CONSIDERATIONS IN SHARING A BUS

Figure 7A:
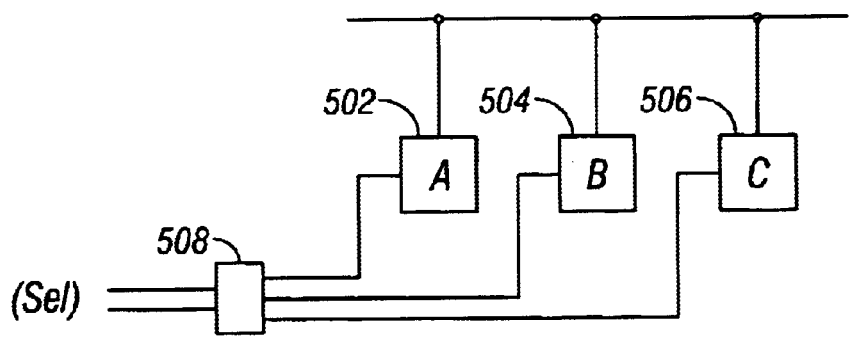
FIGS. 7A, 7B, and 7C show three alternative solutions to the "shared bus" problem.
Figure 7B:
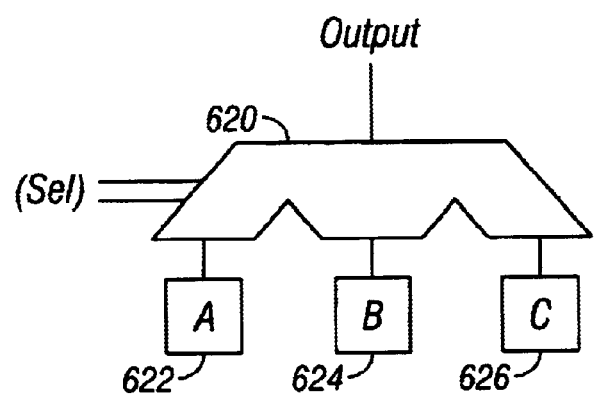
Figure 7C:
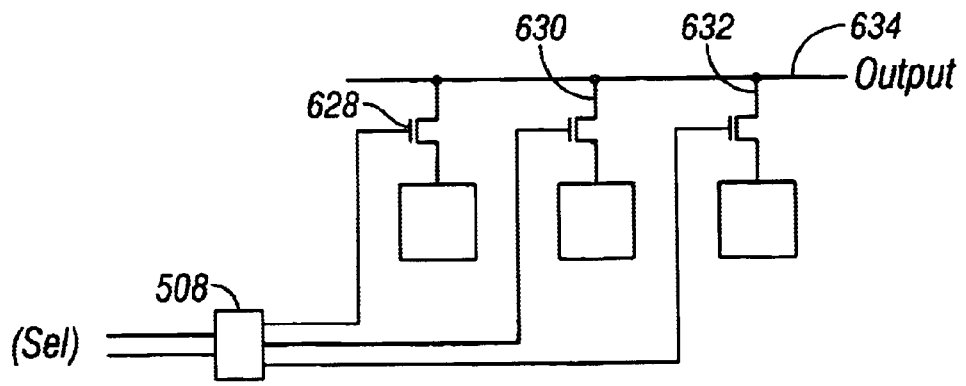

FIGS. 7A, 7B and 7C show three alternative technological solutions to the problem of sharing a bus while avoiding conflicts. FIG. 7A illustrates the use of three-state buffers 502, 504, 506 for placing de-selected outputs into high impedance using logic 508, thus allowing the selected output to drive the bus and avoiding conflicts between drivers.

A second solution, shown in FIG. 7B, shows the multiplexed circuit 620 of the type previously discussed, in which one of multiple inputs 622, 624, 626 is selected for output, which is connected to the shared bus.

As a third alternative, shown in FIG. 7C, depicts pass transistors 628, 630, 632 used to switch one of a multiplicity of signals onto a shared bus 634. Bi-directional (MOS) switches (represented in Verilog as: tran, rtran, tranif0, tranif1, rtranif0, 1) provide a layer of buffering or bi-directional signal paths between circuits. Signals passing through a bi-directional switch are not significantly delayed (i.e., output transitions follow input transitions without significant delay) although switch "turnon" and "turnoff" delays may exist.

Note that technological factors typically influence which solution is optimal, or even possible. Passive gates easily implemented in MOS (Metal Oxide Semiconductor) technologies may be unavailable in bipolar (TTL) technology.

The level of integration also affects the choice of shared bus technology. For example, if the integration supports one basic cell per device/chip, then the typical inter-chip interface will use bi-directional data buses based on three-state technology. If the level of integration supports multiple cells per physical device, then most cell interconnections are entirely within the device.

Many technologies do not support three-state buses within a device, only at I/O pins. Therefore, the multiplexer-based internal solutions imply uni-directional data buses as described above. Whether or not this interface changes for terminal cells that are connected to I/O pins is an architectural decision typically made on the basis of pin costs and other variables.

The case in which the interface contains bi-directional buses is described next. The bidirectional case as the worst case then covers the "mixed" case (unidirectional plus bi-directional buses) as shown in FIG. 6.

DESCRIPTION OF SELF-HEALING BI-DIRECTIONAL BUS CONNECTED CHAIN

Figure 8:
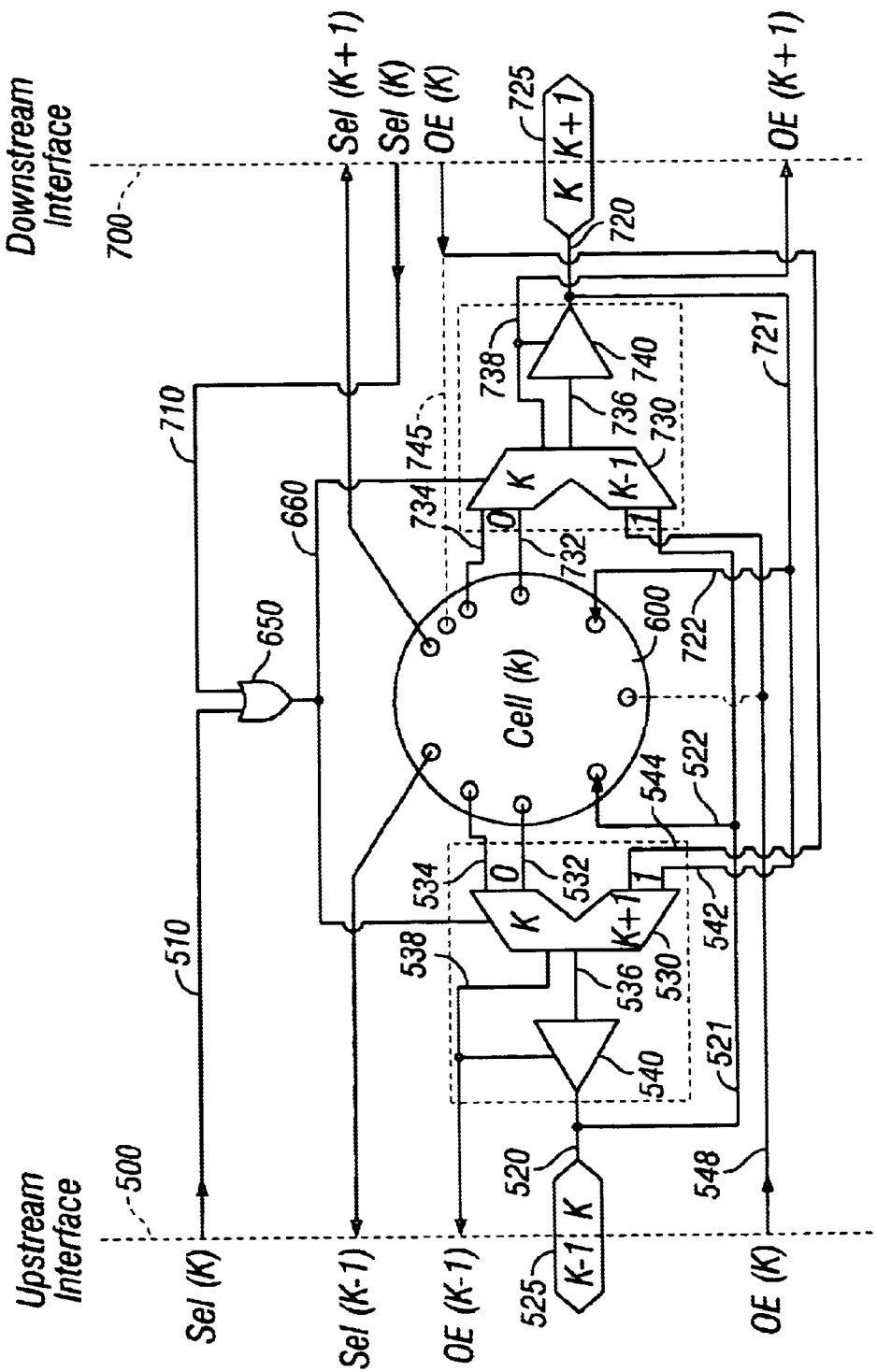
FIG. 8 depicts an extended processing element having bidirectional buses.

In FIG. 8 the $k^{th}$ cell is shown with the bypass circuitry. Initially it is assumed that the cell is "healthy" and operates correctly. The relevant connections in this case are as follows. The $k^{th}$ cell 600 resides between the extended upstream interface 500 and the extended downstream interface 700. The primary connection to the extended upstream interface is the bi-directional bus 520. The primary connection to the extended downstream interface is the bi-directional bus 720. The default condition drives all interface selection lines low. Thus, the sel[k] 510 line from extended upstream interface 500 and the sel[k] line 710 from the extended downstream interface 700, are OR'ed together in a gate 650, producing a low multiplexer control signal 660. Signal 660 controls the bypass circuitry which includes both the upstream multiplexer 530 and the downstream multiplexer 730. When the control signal is a logical zero, the upstream multiplexer 530 selects for output the $k^{th}$ port, consisting of the cell upstream bus 532 and the cell upstream output enable 534. These signals emerge from multiplexer 530 as bus 536 and output enable 538. The output enable 538 is used to control output buffer 540 and is also passed to the extended upstream interface 500.

The multiplexer control signal 660 is also the select line of downstream multiplexer 730. When the control signal is zero, the downstream multiplexer selects for output the $k^{th}$ port downstream, consisting of cell downstream bus 732 and cell output enable signal 734, which emerge from the multiplexer as bus 736 and output enable line 738, respectively. The output enable signal 738 controls output buffer 740 and is also passed to extended downstream interface 700.

Thus, the default settings of the multiplexer select signals 510 and 710 cause upstream multiplexer 530 and the downstream multiplexer 730 of the bypass circuitry to select for output the cell upstream output data bus 532 and associated cell output enable 534 and cell downstream output data bus 732 and associated cell output enable 734.

When cell[k] sends data on the cell upstream data bus 532, it also sets the cell output enable signal 534 to enable output buffer 540. This causes the data appearing on upstream multiplexer output line 536 to pass through buffer 540 and appear on bus 520, optionally connected to an I/O pad 525. If bus 520 connects to an I/O pad 525 then cell[k] is either the only cell in a single chip, or is a terminal cell in a chip containing multiple cells of the chain. In any case, the output data appears on bus 520 and is passed to the next upstream cell[k−1].

Similarly, when cell[k] outputs data on the cell downstream data bus 732 it sets output enable signal 734 to enable output buffer 740, causing the output data appearing on multiplexer 730 output lines 736 to pass through buffer 740 and to appear on bus 720, which is optionally connected to I/O pad 725, if cell[k] is a single cell or a downstream terminal cell.

The above description indicates how cell[k] 600 transmits data out of the cell in either the upstream or downstream direction or both. Next, the description describes how cell[k] 600 receives data into the cell from either the upstream or downstream direction or both.

To receive data from extended upstream interface 500, the cell[k] 600 sets cell output enable 534 to the disable state. Signal 534 emerges from multiplexer 530 as signal 538, which disables output buffer 540, causing its output to enter the high impedance state and allowing bus 520 to be driven by pad 525 in the extended upstream interface 500. Bidirectional bus 520 is connected to bus 521 and thereby to bus 522, which connects to the cell upstream input data bus of cell[k], thus allowing cell[k] to receive data from the extended upstream interface 500.

In symmetrical fashion, to receive data from the extended downstream interface 700, cell[k] 600 sets cell downstream output enable 734 to disable downstream output buffer 740, causing the buffer output to enter the high impedance state and allowing bus 720 to be driven by pad 725 in the extended downstream interface 700. Bus 720 is connected to bus 721 and thereby to bus 722, which connects to the cell downstream input data port of cell[k], thus allowing cell[k] to receive data from the extended downstream interface 700.

The above completely describes the normal connection of cell[k] to both the extended upstream and the extended downstream interfaces, via the use of respective extended upstream and downstream bidirectional data busses.

The element of FIG. 6 is similar to that of FIG. 8 with the exception that a distinction is made between the control lines and data lines of the cell 600. Control lines in FIG. 6 such as RDY, INT, CTRL and ADDR, of the cell 600 connect to the extended upstream 640 or extended downstream 642 interface in a manner similar to the connection of the cell 600 in FIG. 8 to those interfaces 500 and 700. Multiplexers 644 and 646, without three-state outputs, are used to connect the output control signals 648 of the cell 600 to the extended upstream 640 and extended downstream 642 interfaces and fan-in is used to connect the input control signals 652 of the cell 600 to the extended upsteam and extended downstream interfaces via the multiplexers 644 and 646. However, the data lines 654 and 656 of the cell 600 are bidirectional. The upstream data lines 654 of the cell connect to the extended upstream interface 640 via a first bi-directional multiplexer 662 and the downstream data lines 656 of the cell connect to the extended downstream interface 642 via a second bi-directional multiplexer 664.

BYPASS OPERATION

Referring again to FIG. 8, the following describes the case in which either the upstream neighbor or the downstream neighbor decides to bypass cell[k] 600, and thereby attempts to heal a break in the chain. An upstream cell[k−1] accomplishes this by driving a signal on the upstream sel[k] line 510 high (active). A downstream cell[k+1] drives downstream sel[k] line 710 high for the same purpose.

Note that either upstream cell[k−1] or downstream cell [k+1] can independently cause cell[k] to be bypassed. This allows for cases in which a cell partially fails. For example, if cell[k] successfully communicates with its upstream neighbor, cell[k−1], but fails to communicate with its downstream neighbor cell[k+1], then the downstream neighbor cell[k+1] can decide to heal the break in the chain by bypassing cell[k]. The upstream neighbor, cell[k−1] may be unaware of any problem with cell[k]. Of course, the symmetrically opposite case is be handled in the same fashion, where upstream cell[k−1] decides to heal a break that cell[k+1] is unaware of.

Note that such "one-sided" failures can cause the neighbor on the failed side to decide to bypass cell[k] in the middle of communications with the healthy side. This may introduce an error in communications with the healthy side, possibly causing the healthy side to test the interface. In any case, the cell recovery procedure eventually results in both the upstream and downstream neighbors of the bypassed cell determining that the chain was broken and has been healed, with appropriate recovery actions being taken by both sides.

Assuming, for purposes of discussion, that the extended upstream interface 500 drives upstream sel[k] signal 510 high, OR-gate 650 causes multiplexer control signal 660 to go high, thereby disabling the $k^{th}$ ports of the multiplexers 530, 730 and enabling the $k+1^{th}$ port of the multiplexers 530, 730 instead.

The result of this change in multiplexer paths is that the upstream output buffer 540, previously controlled by cell output enable signal 534 of cell[k], is now controlled by the extended downstream interface output enable (OE) line 544, which derives, from the downstream interface 700. Therefore, interface 500 is ultimately controlled by the downstream cell[k+1] as if cell[k] were completely absent.

To drive data upstream, cell[k+1] sets output enable signal OE(k) 544 to the enable state. This signal passes through multiplexer 530 and emerges as signal 538, which enables output buffer 540. Cell[k+1] also drives data onto the extended downstream bus 720, which appears on pad 725, or equivalent, and hence on bus 721, connected to upstream multiplexer 530 as bus 542. (Bus 721 and 542 describe different ends of the same bus.)

Implicit in this operation is that output buffer 740 is in the high impedance state, thereby preventing cell[k] from transferring data on bus 720 and avoiding a conflict with the data from cell[k+1] appearing on bus 720.

As discussed above, devices communicating over a bidirectional bus are synchronized via read and write control signals to avoid driver conflicts. Optionally, the output enable signal(s) can cross the interface and be used for buffer control. For example, the optional output enable line, dashed line 745, from the downstream cell[k+1] is shown entering cell[k]. Note that when cell[k] is bypassed, the same signal OE(k) 544 passes through the upstream multiplexer 530, leaving the multiplexer as signal 538 and connecting to extended upstream interface 500, becoming available to upstream cell[k−1].

Thus downstream cell[k+1] controls upstream output buffers based on either bus control strobes or based explicitly on the upstream output signal 538–544 from downstream cell[k+1].

In either case, upstream cell[k−1] drives its downstream output enable line (corresponding to signal 738 in cell[k]) and this downstream output enable signal is available at extended upstream interface 500 as signal 548. Because the multiplexer select signal 660 has also caused downstream multiplexer 730 to deselect input k and select input k−1, the output enable signal 548 passes through downstream multiplexer 730 and emerges as output enable signal 738, thereby disabling downstream output buffer 740 and avoiding a conflict with the data driven onto bus 720 by downstream cell[k+1].

The remaining case is that in which downstream cell[k+1] accepts data from upstream cell[k−1]. Cell[k+1] drives the output enable signal 544 to the disable state, which, passing through upstream multiplexer 530 and emerging as signal 538, disables output buffer 540, by driving it to high impedance, and optionally informs upstream cell[k−1] of the direction. Cell[k−1] either via normal bus operation, or in response to signal 538, now drives data across extended upstream interface 500 and onto bidirectional bus 520, which, via connection 521 enters downstream multiplexer 730 and emerges on bus 736. Because upstream cell[k−1] is driving the bus, it also asserts output enable signal OE(k) 548 which passes through multiplexer 730, emerging as OE line 738, and enabling output buffer 740, thereby transferring data from cell[k−1] onto the bus 720 connected to cell[k+1], and completely bypassing broken cell[k].

DESCRIPTION OF THE "SELECT" CHANNELS

The above descriptions describe both uni-directional and bi-directional data paths. Both types of paths require multiplexer control or "select" signals. The specific relation of the select signals to the interfaces of the cell is described next.

There are two alternatives; either the select signals are included with all other signals as part of the interface that flows through the multiplexers or the select signals form a separate "control channel" that is outside of the multiplexed path. The latter case, in which the select signals are "outside of" the multiplexers, is shown schematically in FIG. 9.

Figure 9:
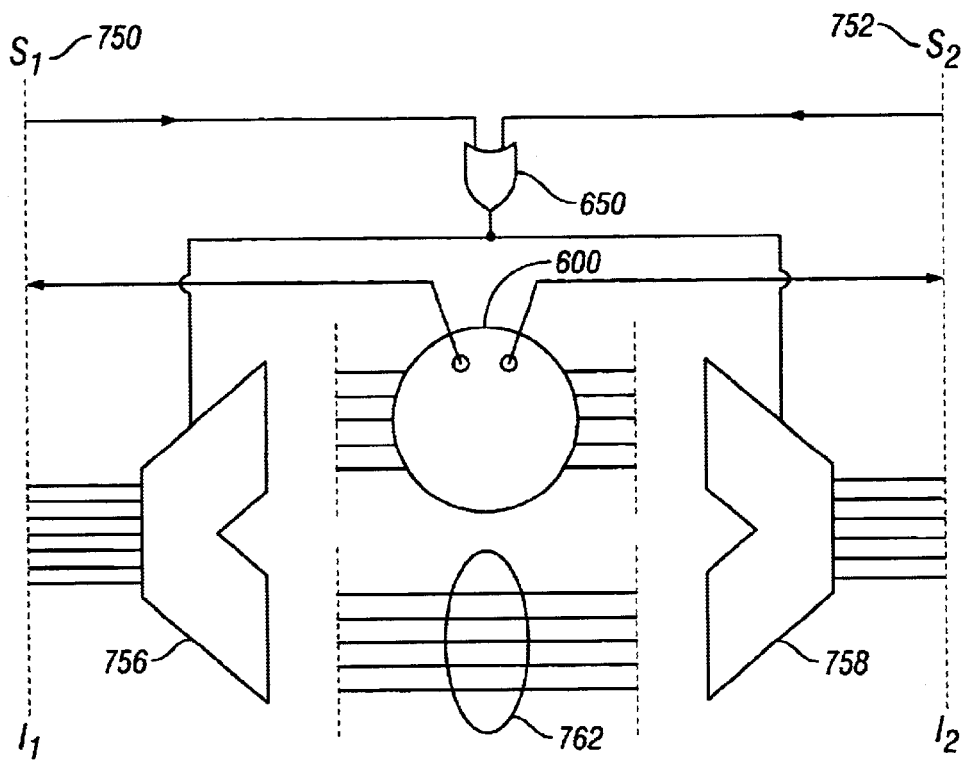
FIG. 9 shows the cell selection signals "outside of" the multiplexers.

The system of FIG. 9, in which the original cell interfaces I1 and I2 are preserved, and the two new "select" interfaces, S1 750 and S2 752 are added, allows for the simplest circuitry. In this case, the input select signals from S1 (upstream) 750 and S2 (downstream) 752 are combined in an "OR" gate 650 such that if either the upstream or the downstream select signal (or both) is asserted the output of the OR gate drives both multiplexers 756 and 758 to the "bypass" channel 762. This level-sensitive scheme using one OR-gate is most economical.

One feature of this system is that, unlike the signals through interfaces I1 and I2, the select signals are not propagated through when a cell is excised. In fact, the OR-gate remains connected to the original neighbor, and can even be used to "un-excise" or return the original cell to the array, bringing it to "existence" again. While this presumably makes little sense if the original cell has truly failed, it is useful if the failure is temporary (unlikely) and also offers a configuration in which arrays of healthy cells have their connections dynamically managed.

The result of having the select signals in the S1 750 and S2 752 interfaces is that the range of the select is limited to one nearest neighbor. This means that the self-healing mechanism can tolerate at most two adjacent total cell failures. The most downstream cell is excised by its nearest downstream neighbor and the most upstream cell is excised by its nearest upstream neighbor. If three cells in a row were to fail, then the array could not be healed without manual intervention. In favor of this approach is the simplicity and economy of the implementation based on level-sensitive select circuitry.

An alternative, based on including the select signals in the multiplexed path, has a different set of characteristics. For example, in the case of an upstream cell that excises a downstream cell by asserting its downstream select output, which is received by its neighbor as the upstream select input signal, thus switching the multiplexers to the "bypass" state, the asserted signal is now propagated through to the next downstream neighbor, and the behavior repeats. The result is that the downstream "de-select" signal will sequentially disable every downstream cell in the chain or array, which is highly undesirable. (Note also that the "take off point" for the select signal should be "outside of" the multiplexer so that, when the multiplexer switches, the signal is not removed from the OR-gate, thereby re-selecting the failed cell)

Thus, if the "de-select" signal is a level, as described above, then the signal requesting and causing the bypass will be passed as a level to the next cell, thereby bypassing this cell, and connecting to the next cell, etc., until the end of the chain is reached. The same analysis applies to upstream bypassing.

Aside from the unintended consequences of bypassing the entire remainder of the chain (up- or down-stream), this version of the selection path has the feature that the range of selection has changed from "nearest neighbor only" to "entire length of chain." It is the level-sensitive nature of the select-detection circuit (the "OR"-gate) that causes "runaway" excision. Altering this by using edge-sensitive signals and detectors defeats the "runaway" propagation of the bypass signal.

Figure 10:
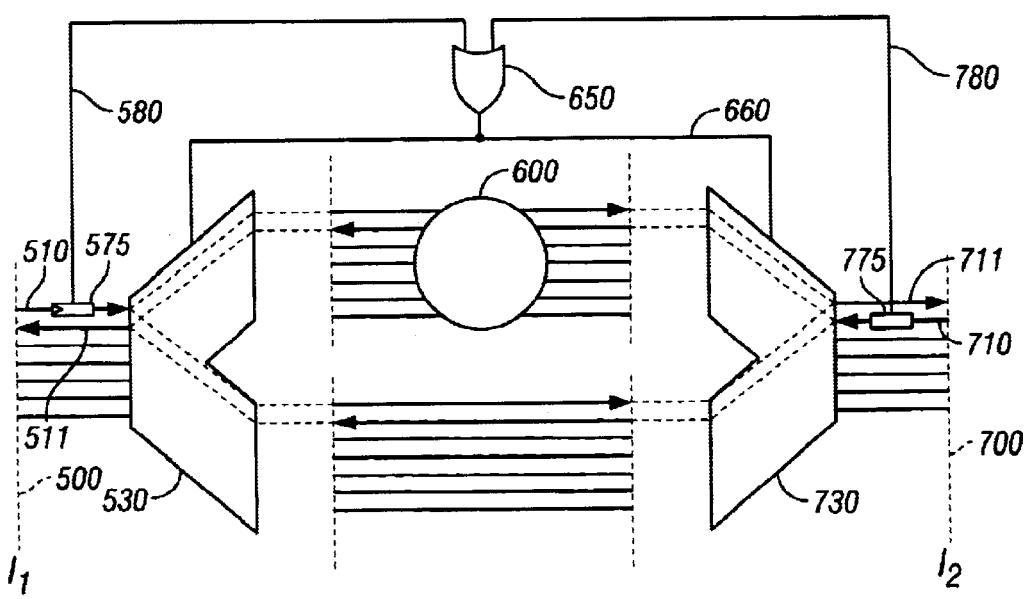
FIG. 10 shows the cells selection signals included with multiplexed signals.

Specifically, the preferred implementation as shown in FIG. 10, includes a pulse detector, or even a multiple-pulse detector, such as a counter, in the bypass circuitry, tapping the input lines, since all outputs are generated by the local cell and are detected as inputs to neighboring cells.

The operation of the system is as follows: The numbering scheme of FIG. 8 is used except for the select signal detection circuits. The changes include the addition of pulse detectors 575 and 775 that tap the extended upstream and downstream select inputs, respectively, and the fact that selection signals are now included in the multiplexed path, as indicated by the heavy lines 510 and 511 at the extended upstream interface 500 and 710 and 711 at the extended downstream interface 700.

The pulse detector circuits are edge-sensitive, not level-sensitive, and have the effect of preventing "runaway" or "auto propagation" of the bypass signal as was the case for a level sensitive bypass signal. Although numerous edge sensitive circuits can be designed to perform the desired function, the preferred implementation employs counters.

The "width" of the binary counter defines the number of pulses that must be seen to produce an "overflow" or "carry" signal, 580, 780 and it is this signal that is received by the level sensitive OR gate 650, thereby producing the multiplexer control signal 660 that excises the cell by switching to the bypass state. As shown, if the counter is pulsed again, and the carry signal eventually toggles, bringing the excised cell "back into existence." This is prevented either by latching the carry 580, 780 or by moving the counter "inside" of the multiplexer so that it lies between the multiplexer and the local cell. Moving the counter inside the multiplexer has the generally desirable effect of requiring a predetermined number of pulses or "votes" before removing the cell from the array and of maintaining the multiplexer in the desired state "forever," since the counter is removed from the path when the multiplexer switches. Only a reset signal can reset the state of the counter circuitry and deactivate the bypass circuitry in elements that have been bypassed.

Figure 11:
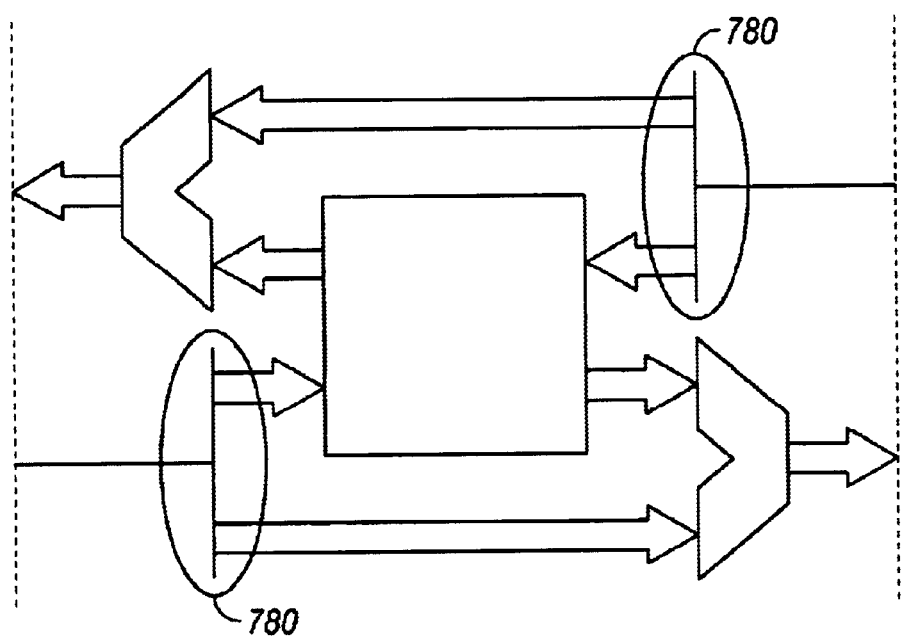
FIG. 11 depicts the actual multiplexer arrangement for cell with unidirectional data buses.

Actually, the upstream multiplexer 530 shown in FIG. 10 is conceptual. In some embodiments, inputs are not multiplexed, but are replicated based on "fan-out" as described earlier. Replicating inputs 780, as shown in FIG. 11, does not remove the counter from the cell path when the select signal changes. Therefore, a gating circuit is required to disable the counter. Such a gating circuit is easily implemented using the carry of the counter itself to gate off the input to the counter. (One skilled in the art of digital design can of course discern many alternatives and these are included within the scope of the invention.)

Once the counter is removed from the cell (concurrently with the switch of the multiplexer) then the upstream input select signals are passed downstream (and vice-versa) and are used to pulse downstream counters. These behave as described, thereby allowing the upstream cell (say) to sequentially (but not automatically as in the level sensitive case) excise as many damaged cells as desired, while stopping the process as soon as the appropriate responses to the test are seen. This is the most general self-healing circuit and the preferred implementation, although the level sensitive implementation is preferred in cases where "alternate phase" systolic/peristaltic processes is desired.

N-DIMENSIONAL ARRAYS WITH EXCISE AND HEAL PROPERTIES

Figure 12:
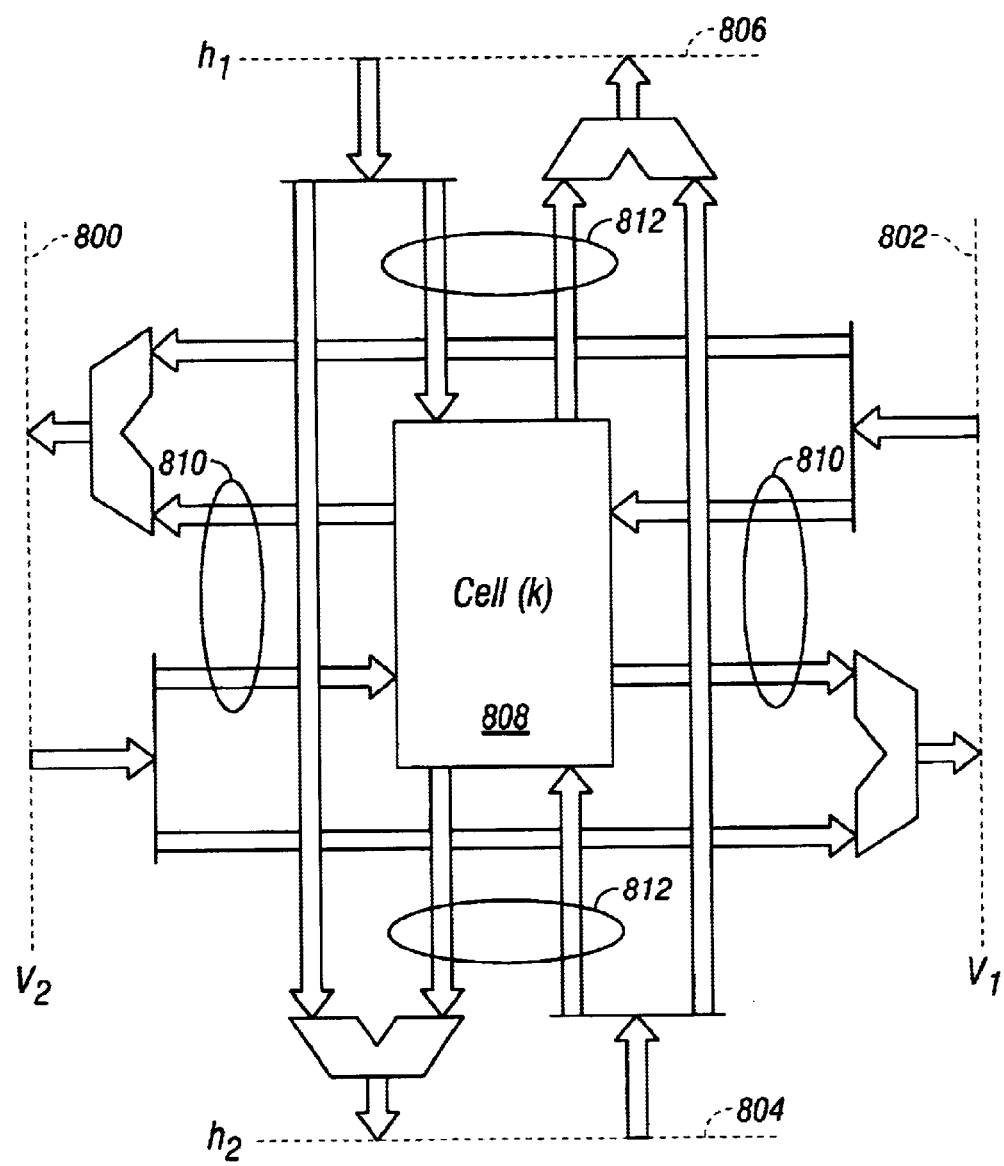
FIG. 12 shows a diagram of a two-dimensional cell capable of supporting cell excision and array self-healing. All horizontal interfaces are identical and all vertical interfaces are identical but horizontal and vertical interfaces may differ.

The description above has focused on one-dimensional arrays for simplicity, however the initial discussion described the invention as applying to N-Dimensional arrays, that is, N orthogonal linear arrays. In each dimension the mechanism is the same, however orthogonal, dimensions may differ in their interface (see examples in U.S. Pat. No. 6,021,453). Nevertheless, within any array dimension the interface between cells is the same for all cells, and, therefore the preceding mechanism will work in each array dimension, because the basic mechanism is interface-independent. A conceptual diagram of a two-dimensional cell is shown in FIG. 12, where extended interfaces 800 and 802 are part of a first dimension and extended interfaces 804 and 806 are part of the second dimension. Cell 808 has paths 810 for the first dimension and paths 810 for the second dimension.

"ALTERNATE PHASE" OPERATION USING HEALTHY CELLS

Figure 13:
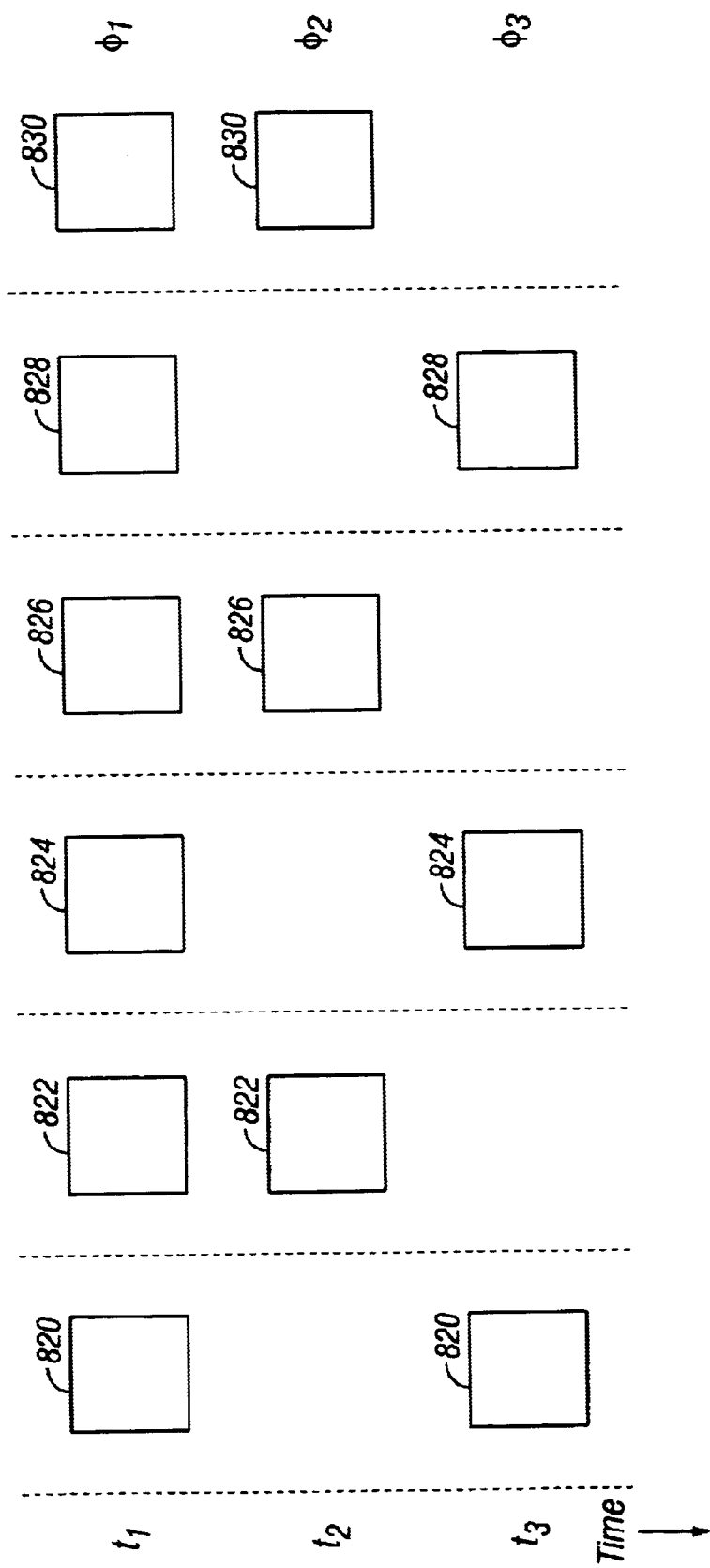
FIG. 13 depicts the "alternate phase" sequence of operation possible using the cell select/de-select mechanism on healthy cells, but switching the connectivity between nearest neighbor cells and next nearest neighbor cells.

As shown in FIG. 13, the 'select/deselect' mechanism presented herein can be used to excise elements having faulty cells in an array. If the array consists only of elements with healthy cells, then the mechanism offers a connectivity scheme in which the elements can alternate their communication between nearest neighbors (the normal case) and between next-nearest neighbors (by deselecting the neighbors.) This is especially valuable for certain algorithms. According to FIG. 13, in phase $\phi 1$, all of the elements, 820, 822, 824, 826, 828 and 830 are present in the chain. In phase $\phi 2$, every other element 822, 826, 830 starting with element 822 is present and in phase $\phi 3$, every other element 820, 824, 826, 828 is present starting with element 820. Once alternate phase operations between $\phi 2$ and $\phi 3$ are started, phase $\phi 1$ need only exist as an intermediate state and for a time sufficient to toggle between phase $\phi 2$ and $\phi 3$.

"ALTERNATE TEST PATH"

Figure 14:
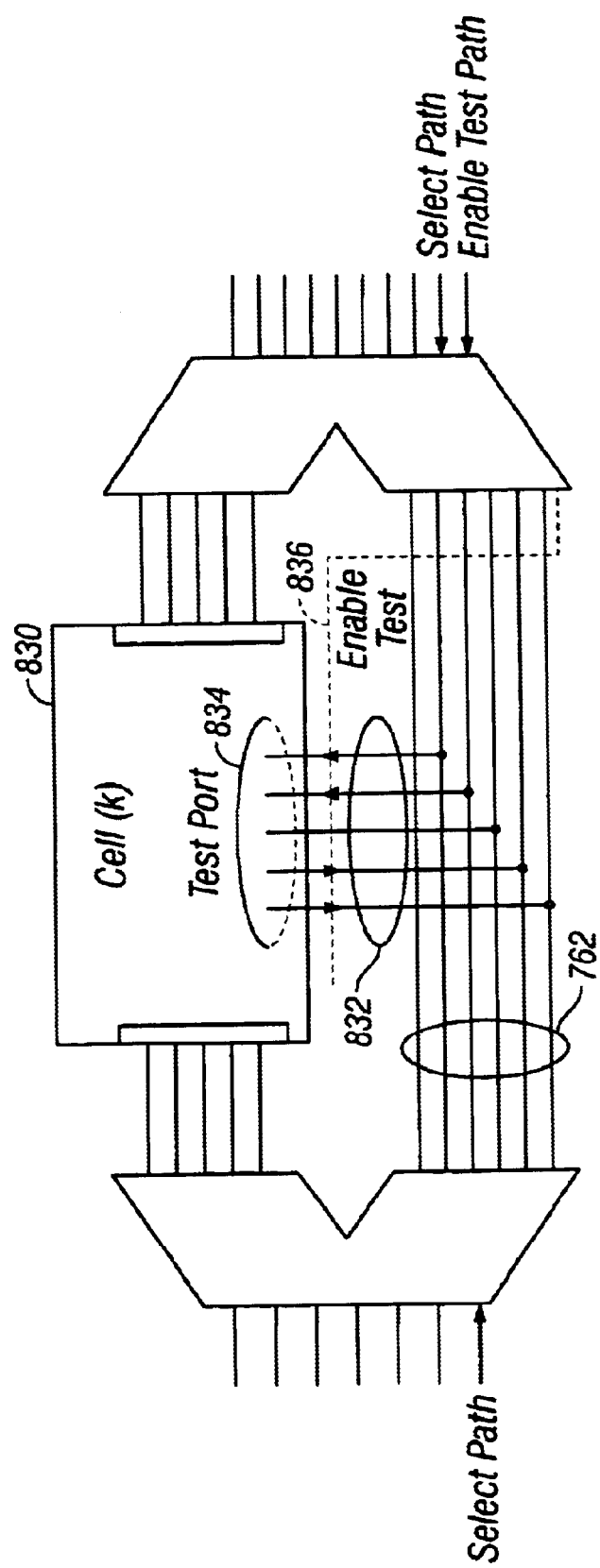
FIG. 14 shows the potential use of the bypass channel for manufacturing test or similar purposes by including connections to a test port in the basic cell, such test connections being capable of making and breaking connectivity.

Turning to FIG. 14, in cells which implement the 'bypass channel 762,' for use in bypassing faulty cells from the array, it is possible to add still another path 832, to connect the bypass channel 762 and a suitable 'test port' 834 in the 'side' of the cell 830. The connection between the test port and the 'bypass channel 762' can be made during manufacturing test or other appropriate time, and then disconnected (by an appropriate control signal 836) such that the normal operation of the bypass channel 762 described herein may apply.

Figure 15:
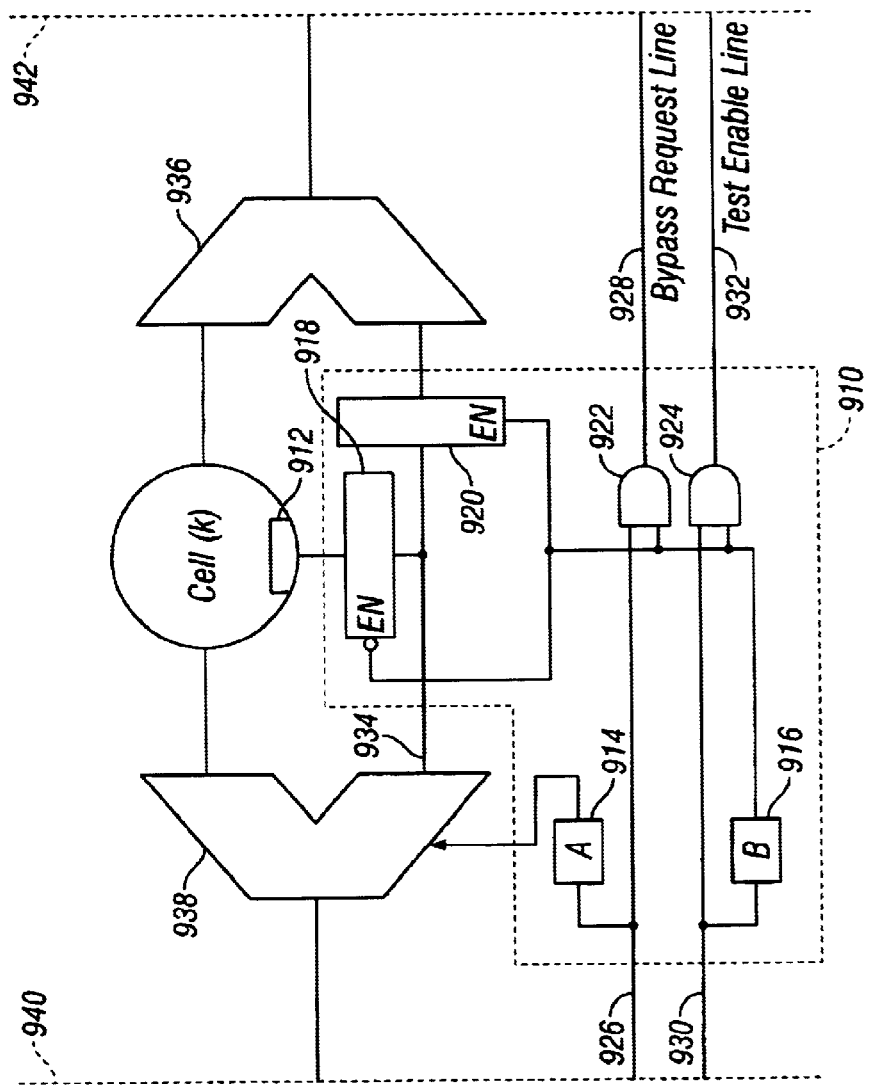
FIG. 15 shows circuitry included in the bypass circuitry for connecting the test port of the processor in an element to a remote extended interface.

FIG. 15 shows test circuitry 910 included in the bypass circuitry for connecting the test port 912 of the processor in an element to an extended upstream interface 940. The additional circuitry includes pulse detectors A 914 and B 916 and logic circuitry 918, 920, 922, 924, as shown. A bypass request line 926 connects to pulse detector A 914 and to the logic circuitry and an test enable signal 930 connects to pulse detector B 916 and the logic circuitry.

Logic circuitry includes a buffer 918 for connecting the test port to the internal bus 934, a buffer 920 for connecting the internal bus 934 to the downstream multiplexer 936 and gating circuitry 922, 924 for propagating the bypass request line 926 and test enable line 930 to the bypass request line 928 and test enable line 932 of next downstream element.

Assuming at the start that neither pulse detector has received any pulses, when the bypass request line 926 is pulsed, pulse detector A 914 detects the transition of the signal on that line and activates the bypass circuitry 936, 938 of the element. Because the test enable signal 930 has not been pulsed, the output of pulse detector B 916 is a logic 0, enabling the test port 912 of the cell onto the internal bypass bus 934 of the element. The test port 912 of the cell is now accessible via the extended upstream interface 940. Also, the bypass request signal; 926 and the test enable signal 930 are inhibited by gates 922 and 924 from propagating to the next downstream element.

If the test enable signal 930 is now pulsed, the output of pulse detector B 916 becomes a logic 1. This disables the connection of the cell's test port 912 to the element internal bus 934 and thus to the extended upstream interface 940 and allows the bypass request signal 926, the test enable signal 930 and the element internal bus 934 to propagate to the next downstream element. The next downstream element can now be tested when the bypass request signal is again pulsed to activate the bypass of that element.

Thus, the number of times the test enable line is pulsed determines which processing element is accessible for testing. When a particular element is accessible, a single pulse on the bypass request line activates the bypass circuitry for that element so that the test port accessible. Also each processing element has the same circuitry to permit testing of the element's processor.

Although the invention applicable to radio-connected cell systems, such as current "Blue Tooth" cell-based systems, it is illustratively described an array consisting of silicon processor cells connected to specific interfaces.

Although the present invention has been described in considerable detail with reference to certain preferred versions thereof, other versions are possible. Therefore, the spirit and scope of the appended claims should not be limited to the description of the preferred versions contained herein.

What is claimed is:

1. An extended processor element for connection between an upstream processor element and a downstream processor element, the extended processor element comprising:
    a processing cell having an upstream interface and a downstream interface, said processing cell for performing processing operations of the extended processor element; and
    bypass circuitry for bypassing the processing cell, said bypass circuitry connected to at least one select line to receive a select signal and connected between the extended upstream interface and said cell upstream interface and between the extended downstream interface and cell downstream interface,
        wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal.

2. An extended processor element for connection between an upstream processor element and a downstream processor element as recited in claim 1,
    wherein said bypass circuitry connects to a reset line to receive a reset signal; and
    wherein once said bypass circuitry is operative to connect the extended upstream interface to the extended downstream interface, said extended interfaces remain connected until a reset signal is asserted on said reset line.

3. An extended processor element for connection between an upstream processor element and a downstream processor element as recited in claim 1, wherein, if said bypass circuitry has received an active select signal and has connected the extended upstream interface to the extended downstream interface, said bypass circuitry is operative to connect said cell upstream interface to the extended upstream interface and said cell downstream interface to the extended downstream interface, if the active select signal becomes inactive.

4. An extended processor element for connection between an upstream processor element and a downstream processor element as recited in claim 1,
    wherein the extended upstream and extended downstream interface each include an input select line; and
    wherein said bypass circuitry is connected to each input select line to receive the input select signals, either select signal, when active, causing said bypass circuitry to connect the extended interfaces.

5. An extended processor element for connection between an upstream processor element and a downstream processor element as recited in claim 4, wherein both select lines having an inactive signal cause said bypass circuitry to connect the extended upstream interface to said cell upstream interface and the extended downstream interface to said cell downstream interface.

6. An extended processor element for connection between an upstream processor element and a downstream processor element as recited in claim 4,
    wherein the active signal on either select line is a logic level; and
    wherein said bypass circuitry only receives the upstream and downstream input select lines.

7. An extended processor element for connection between an upstream processor element and a downstream processor element as recited in claim 6, wherein said bypass circuitry includes an OR gate whose inputs directly receive the input select lines, an active output of the OR gate causing said bypass circuitry to connect the extended interfaces.

8. An extended processor element for connection between an upstream processor element and a downstream processor element as recited in claim 4,
    wherein the active signal on either select line is a transition of the signal;
    wherein the upstream input select line is propagated to the extended downstream interface; and
    wherein the downstream input select line is propagated to the extended upstream interface.

9. An extended processor element for connection between an upstream processor element and a downstream processor element as recited in claim 8,
    wherein said bypass circuitry includes a pair of pulse detectors, respectively receiving the upstream and downstream input select lines, each pulse detector having an output with an active logic level when a transition of the respective input select signal occurs; and
    wherein said bypass circuitry includes an OR gate whose inputs receive the outputs of the pulse detectors, an output of the OR gate causing said bypass circuitry to connect the extended interfaces.

10. An extended processor element for connection between an upstream processor element and a downstream processor element as recited in claim 9, wherein each pulse detector has an output with an active logic level when a predetermined number of transitions of the respective input select signals occur, each pulse detector operative to maintain the active logic level on its output despite additional transitions of the input select signal beyond the predetermined number.

11. An extended processor element for connection between an upstream processor element and a downstream processor element as recited in claim 10,
    wherein each pulse detector is a edge-triggered counter;
    wherein each counter has an output with an active logic level when a predetermined number of transitions of the respective input select signals occur; and
    wherein the counter is prevented from counting when the counter output has an active logic level.

12. An extended processor element for connection between an upstream processor element and a downstream processor element as recited in claim 8, wherein said bypass circuitry includes selection circuitry to connect the extended upstream interface to the extended downstream interface; and wherein the upstream input select signal is propagated to the extended downstream interface via the selection circuitry and the downstream input select signal is propagated to the extended upstream interface via the selection circuitry when said bypass circuitry connects the extended interfaces.

13. An extended processor element for connection between an upstream processor element and a downstream processor element as recited in claim 1, wherein said cell includes a test port; and wherein the upstream and downstream interfaces each include an enable test path signal, an activated upstream enable test path signal causing the test port to be connected to the upstream interface, thereby permitting upstream access to the test port, and an activated downstream enable test path signal causing the test port to be connected to the downstream interface, thereby permitting downstream access to the test port.

14. An extended processor element for connection between an upstream processor element and a downstream processor element as recited in claim 1, wherein the extended upstream and extended downstream interfaces each include an input and output bus and the upstream and downstream cell interfaces each include an input and output bus.

15. An extended processor element for connection between an upstream processor element and a downstream processor element as recited in claim 14, wherein said bypass circuitry includes selection circuitry connected to the input and output busses of the extended upstream and extended downstream interfaces and the input and output busses of said cell interfaces; and wherein the selection circuitry includes a pair of unidirectional multiplexers, the first of the pair of unidirectional multiplexers having a selection output connected to the extended upstream interface output bus, the second of the pair of multiplexers having a selection output connected to the extended downstream interface output bus, one selection input of the first multiplexer connected to said cell upstream interface output bus and the other selection input of the first multiplexer connected to the extended downstream input bus, the extended downstream input bus having sufficient drive to also connect to said cell downstream input bus, and one selection input of the second multiplexer connected to said cell downstream interface output bus and the other selection input connected to the extended upstream input bus, the extended upstream input bus having sufficient drive to also connect to said cell upstream input bus.

16. A extended processor element for connection between an upstream processor element and a downstream processor element as recited in claim 14, wherein the extended upstream and extended downstream interface each include an upstream output select line, the upstream output select line and the downstream output select line each connected to and driven by said cell.

17. An extended processor element for connection between an upstream processor element and a downstream processor element, the extended processor element comprising:

a processing cell having an upstream interface and a downstream interface, said processing cell for performing processing operations of the extended processor element; and bypass circuitry for bypassing the processing cell, said bypass circuitry connected to at least one select line to receive a select signal and connected between the extended upstream interface and said cell upstream interface and between the extended downstream interface and cell downstream interface, wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal, and wherein the extended upstream and extended downstream interfaces each include a bidirectional bus and the upstream and downstream cell interfaces each include a bidirectional bus.

18. An extended processor element for connection between an upstream processor element and a downstream processor element as recited in claim 17, wherein said bypass circuitry includes selection circuitry connected to the bidirectional busses of the extended upstream and extended downstream interfaces and the bidirectional buses of said cell interfaces, wherein the selection circuitry includes an upstream and downstream bidirectional multiplexer, a selection output of the upstream bidirectional multiplexer connected to the extended upstream interface bus and a selection output of the downstream bidirectional multiplexer connected to the extended downstream interface bus, a first selection input of the upstream multiplexer connected to said cell upstream interface bus and the second selection input connected to an internal bus, and a first selection input of the downstream multiplexer connected to said cell downstream interface bus and the second selection input connected to the internal bus; and wherein, when the first selection inputs of the upstream and downstream multiplexers are connected to the selection output of the upstream and downstream multiplexer, respectively, said cell is operative to transfer data on either the upstream or downstream buses and when the second selection inputs of the upstream and downstream multiplexers are connected to the selection outputs, respectively, the bidirectional buses of the extended upstream and extended downstream interfaces are connected via the internal bus.

19. An extended processor element for connection between an upstream processor element and a downstream processor element as recited in claim 18, wherein said cell includes a test port, said bypass circuitry includes test circuitry and the upstream and downstream interfaces each include a test enable line and a bypass request line connected to the test circuitry;

wherein, prior to receiving a pulse on the test enable line, the internal bus, test enable line and the bypass request line are blocked from the downstream interface and the test port of said cell is connected to the internal bus, such that, when the bypassing circuitry is activated, the test port is accessible from the extended upstream interface; and wherein, after receiving a pulse on the test enable line, the internal bus, test enable line and the bypass request line connect to the downstream interface and the test port of said cell is disconnected from the internal bus.

20. An extended processor element for connection between an upstream processor element and a downstream processor element, the extended processor element comprising:

a processing cell having an upstream interface and a downstream interface, said processing cell for performing processing operations of the extended processor element; and bypass circuitry for bypassing the processing cell, said bypass circuitry connected to at least one select line to receive a select signal and connected between the extended upstream interface and said cell upstream interface and between the extended downstream interface and cell downstream interface, wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal, and wherein the extended upstream and extended downstream interfaces each include a bidirectional bus and the upstream and downstream cell interfaces each include an input and output bus.

21. An extended processor element for connection between an upstream processor element and a downstream processor element as recited in claim 20, wherein the extended upstream and downstream interfaces each include an input and an output OE line and the upstream and downstream cell interfaces each include an output OE line;

wherein said bypass circuitry includes selection circuitry connected to the bidirectional busses of the extended upstream and extended downstream interfaces and the buses of said cell interfaces, the selection circuitry including an upstream and a downstream unidirectional multiplexer, the upstream multiplexer having a selection output connected to the extended upstream interface bus and the upstream output OE line, the selection output of the upstream multiplexer being enabled when the upstream output OE line is active, a first selection input of the upstream multiplexer connected to said cell upstream interface output bus and cell upstream output OE line and a second selection input of the upstream multiplexer connected to the extended downstream bidirectional bus and downstream input OE line, the extended downstream bidirectional bus having sufficient drive to also connect to said cell downstream input bus;

wherein, when the first selection input of the upstream multiplexer is connected to the selection output, said cell is operative to transfer data on the upstream bidirectional bus and drive the upstream output OE line and when the second selection input of the upstream multiplexer is connected to the selection output, the extended downstream interface bus and downstream input OE line are operative to transfer data on the upstream bidirectional bus and drive the upstream output OE line, respectively;

wherein the downstream multiplexer has a selection output connected to the extended downstream interface bus, the selection output of the downstream multiplexer being enabled when the downstream output OE line is active, a first selection input of the downstream multiplexer connected to said cell downstream interface output bus and cell downstream output OE line and a second selection input connected to the extended upstream bidirectional bus and upstream OE input line, the extended upstream bidirectional bus having sufficient drive to also connect to said cell upstream input bus;

wherein, when the first selection input of the downstream multiplexer is connected to the selection output, said cell is operative to transfer data on the downstream bidirectional bus and drive the downstream OE line and when the second selection input is connected to the selection output, the extended upstream interface bidirectional bus and input OE line are operative to transfer data on the downstream bidirectional bus and drive the downstream output OE line, respectively; and wherein, when the second selection inputs of the upstream and downstream multiplexers are selected for output, the extended upstream interface is effectively connected to the extended downstream interface, thereby bypassing said cell.

22. An extended processor element for connection between an upstream processor element and a downstream processor element as recited in claim 21, wherein the upstream input OE line is connected to said cell.

23. An extended processor element for connection between an upstream processor element and a downstream processor element as recited in claim 21, wherein the downstream input OE line is connected to said cell.

24. An extended processor element for connecting to an upstream processor element and a downstream processor element, the extended processor element comprising:

a processing cell having an upstream interface and a downstream interface, said cell for performing processing operations of the element; and reconnection circuitry having an extended upstream interface for connecting to the adjacent upstream processor element and an extended downstream interface for connecting to the adjacent downstream processor element, said reconnection circuitry for disconnecting said cell from the extended upstream and extended downstream interfaces when said cell is determined to be faulty and for connecting a healthy replacement cell to the extended upstream and extended downstream interfaces in place of the faulty cell.

25. A chain of processor elements, the chain comprising:

a plurality of extended processor elements, an extended processor element connected only to a downstream processor element being the head of the chain, an extended processor element connected only to an upstream processor element being the tail of the chain;

wherein each extended processor element has an extended upstream interface for connecting to an upstream processor element and an extended downstream interface for connecting to a downstream processor element; and wherein each extended processor element includes:

a processing cell for carrying out the processing operations of the extended processor element; and bypass circuitry for bypassing the processing cell, said bypass circuitry connected to at least one select line to receive a select signal and connected between the extended upstream interface and said cell upstream interface and between the extended downstream interface and cell downstream interface, wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal.

26. A chain of processor elements, the chain comprising:

a plurality of extended processor elements, an extended processor element connected only to a downstream processor element being the head of the chain, an extended processor element connected only to an upstream processor element being the tail of the chain;

wherein each extended processor element has an extended upstream interface for connecting to an upstream processor element and an extended downstream interface for connecting to a downstream processor element; and wherein each extended processor element includes:

a processing cell for carrying out the processing operations of the extended processor element; and bypass circuitry for bypassing the processing cell, said bypass circuitry connected to at least one select line to receive a select signal and connected between the extended upstream interface and said cell upstream interface and between the extended downstream interface and cell downstream interface, wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal; and wherein an upstream processor element removes said cell of an adjacent downstream processor element from the chain by making the select signal received by said bypass circuitry of the downstream processor element active.

27. A chain of processor elements as recited in claim 26, wherein the upstream processor element removes said cell of the adjacent downstream processor element from the chain when the upstream processor element detects a failure in the downstream cell.

28. A chain of processor elements, the chain comprising:

a plurality of extended processor elements, an extended processor element connected only to a downstream processor element being the head of the chain, an extended processor element connected only to an upstream processor element being the tail of the chain;

wherein each extended processor element has an extended upstream interface for connecting to an upstream processor element and an extended downstream interface for connecting to a downstream processor element; and wherein each extended processor element includes:

a processing cell for carrying out the processing operations of the extended processor element; and bypass circuitry for bypassing the processing cell, said bypass circuitry connected to at least one select line to receive a select signal and connected between the extended upstream interface and said cell upstream interface and between the extended downstream interface and cell downstream interface, wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal; and wherein a downstream processor element removes said cell of an adjacent upstream processor element from the chain by making the select signal received by said bypass circuitry of the upstream processor element active.

29. A chain of processor elements as recited in claim 28, wherein the downstream processor element removes said cell of the adjacent upstream processor element from the chain when the downstream processor element detects a failure in the upstream cell.

30. A chain of processor elements, the chain comprising:

a plurality of extended processor elements, an extended processor element connected only to a downstream processor element being the head of the chain, an extended processor element connected only to an upstream processor element being the tail of the chain;

wherein each extended processor element has an extended upstream interface for connecting to an upstream processor element and an extended downstream interface for connecting to a downstream processor element; and wherein each extended processor element includes:

a processing cell for carrying out the processing operations of the extended processor element, and bypass circuitry for bypassing the processing cell, said bypass circuitry connected to at least one select line to receive a select signal and connected between the extended upstream interface and said cell upstream interface and between the extended downstream interface and cell downstream interface, wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal;

wherein the extended upstream and extended downstream interfaces each include a downstream bypass request signal that traverses the chain; and wherein an upstream processor element can bypass a plurality of adjacent downstream processor elements by pulsing the downstream bypass request signal.

31. A chain of processor elements, the chain comprising:

a plurality of extended processor elements, an extended processor element connected only to a downstream processor element being the head of the chain, an extended processor element connected only to an upstream processor element being the tail of the chain;

wherein each extended processor element has an extended upstream interface for connecting to an upstream processor element and an extended downstream interface for connecting to a downstream processor element; and wherein each extended processor element includes:

a processing cell for carrying out the processing operations of the extended processor element; and bypass circuitry for bypassing the processing cell, said bypass circuitry connected to at least one select line to receive a select signal and connected between the extended upstream interface and said cell upstream interface and between the extended downstream interface and cell downstream interface, wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal;

wherein the extended upstream and extended downstream interfaces each include an upstream bypass request signal that traverses the chain; and wherein a downstream processor element can bypass a plurality of adjacent upstream processor elements by pulsing the upstream bypass request signal.

32. A chain of processor elements, the chain comprising:
a plurality of extended processor elements, an extended processor element connected only to a downstream processor element being the head of the chain, an extended processor element connected only to an upstream processor element being the tail of the chain;

wherein each extended processor element has an extended upstream interface for connecting to an upstream processor element and an extended downstream interface for connecting to a downstream processor element; and wherein each extended processor element includes:
a processing cell for carrying out the processing operations of the extended processor element; and
bypass circuitry for bypassing the processing cell, said bypass circuitry connected to at least one select line to receive a select signal and connected between the extended upstream interface and said cell upstream interface and between the extended downstream interface and cell downstream interface,
wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal;

wherein the extended downstream interface has a bypass signal that connects only to any adjacent downstream element;

wherein the downstream bypass request signal of every other processor element starting at the head element in the chain is activated to cause each adjacent downstream processor element to be bypassed in a first phase, a second phase following upon the end of the first phase; and wherein the downstream bypass request signal of every other processor element starting at the downstream element immediately adjacent to the head element is activated to cause each adjacent downstream processor element to be bypassed in the second phase, the first phase following upon the end of the second phase, so that alternate phase operation of processor elements in the chain is achieved.

33. A chain of processor elements, the chain comprising:
a plurality of extended processor elements, an extended processor element connected only to a downstream processor element being the head of the chain, an extended processor element connected only to an upstream processor element being the tail of the chain;

wherein each extended processor element has an extended upstream interface for connecting to an upstream processor element and an extended downstream interface for connecting to a downstream processor element; and wherein each extended processor element includes:
a processing cell for carrying out the processing operations of the extended processor element; and
bypass circuitry for bypassing the processing cell, said bypass circuitry connected to at least one select line to receive a select signal and connected between the extended upstream interface and said cell upstream interface and between the extended downstream interface and cell downstream interface,
wherein said bypass circuitry is operative to connect the extended upstream interface to the extended downstream interface in response to an active select signal, and to connect said cell upstream interface to the extended upstream interface and said cell downstream interface to the extended downstream interface in response to an inactive select signal;

wherein the extended upstream interface has a bypass signal that connects only to any adjacent upstream element;

wherein the upstream bypass request signal of every other processor element starting at the tail element in the chain is activated to cause each adjacent upstream processor element to be bypassed in a first phase, a second phase following upon the end of the first phase; and wherein the upstream bypass request signal of every other processor element starting at the upstream element immediately adjacent to the tail element is activated to cause each adjacent up stream processor element to be bypassed in the second phase, the first phase following upon the end of the second phase, so that alternate phase operation of processor elements in the chain is achieved.

34. In a chain of extended processor elements each having a processing cell for carrying out the processing operations of the extended processor element, and bypass circuitry to connect said cell to an extended upstream interface and an extended downstream interface of the extended processor element when said bypass circuitry is not activated, and to connect the extended upstream interface to the extended downstream interface when said bypass circuitry is activated, the chain being formed by connecting upstream and downstream interfaces to each other, a method of removing a processing cell from a processor element, the method comprising the steps of:

receiving information indicating that testing is required of the upstream processor element;

testing the upstream processor element to determine whether said cell of the upstream element responds correctly; and activating the upstream processor element bypass circuitry to connect the upstream interface to the downstream interface of the upstream processor element if the upstream processor element does not respond correctly.

35. A method of removing a processing cell from a processor element as recited in claim 34, wherein the step of receiving information indicating that testing is required of the upstream processor element includes the step of receiving an error indication from the upstream processor element.

36. A method of removing a processing cell from a processor element as recited in claim 34, wherein the step of receiving information indicating that testing is required of the upstream processor element includes the step of receiving an indication that the upstream processor element did not respond in a predetermined time period.

37. A method of removing a processing cell from a processor element as recited in claim 34, wherein the step of testing the upstream processor element includes:
    issuing a test query having a known response to an upstream processor element by a downstream processor element;
    awaiting the response from the upstream processor element during a predetermined time period; at the end of the predetermined time period, receiving no response or during the predetermined time period receiving an erroneous response from the upstream processor element.

38. A method of removing a processing cell from a processor element as recited in claim 34, wherein a processor element upstream of the bypassed processor element is resynchronized with the downstream element that activated said bypass circuitry.

39. A method of operating a chain of extended processor elements in alternate phases, each element having a processing cell for carrying out the processing operations of the extended processor element, and bypass circuitry to connect said cell to an extended upstream interface and an extended downstream interface of the extended processor element when said bypass circuitry is not activated, and to connect the extended upstream interface to the extended downstream interface when said bypass circuitry is activated, the chain being formed by connecting upstream and downstream interfaces to each other, each extended upstream interface having a bypass request line connected to any adjacent upstream element, each extended downstream interface having a bypass request line connected to any adjacent downstream element, the method comprising the steps of:
    activating a signal on the downstream bypass request line by every other processor element to activate said bypass circuitry of the next adjacent downstream element in a first phase, a second phase following the end of the first phase;
    deactivating the signal on the downstream bypass request line by every other processor element to restore the element to normal operation in the second phase; and
    activating the signal on the downstream bypass request line by each processor element bypassed in the first phase to bypass the next adjacent downstream element in the second phase.

40. A method of testing a processing cell of an extended processor element in a chain of extended processor elements, each element having a processing cell for carrying out the processing operations of the extended processor element, said cell including a test port, and bypass circuitry to connect said cell to an extended upstream interface and an extended downstream interface of the extended processor element when said bypass circuitry is not activated, and to connect the extended upstream interface to the extended downstream interface when said bypass circuitry is activated, said bypass circuitry including test circuitry, the chain being formed by connecting upstream and downstream interfaces to each other and having a head element and a tail element, the upstream and downstream interfaces having a bypass request line and a test enable line traversing the chain, the method comprising the steps of:
    if testing a processor element other than the element at the head of the chain, issuing one or more pulses on the test enable line to select the processor element for testing; and
    issuing a pulse on the bypass request line to activate said bypass circuitry of the selected element, the test circuitry operative to block the connection of the extended upstream interface to the extended downstream interface and enable the connection of the test port to the extended upstream interface; and
    if testing the head processor element, issuing a pulse on the bypass request line to activate said bypass circuitry of the head element, the test circuitry operative to block the connection of the extended upstream interface to the extended downstream interface and enable the connection of the test port to the extended upstream interface.

41. An extended processor element for connection between an upstream processor element and a downstream processor element, the extended processor element comprising:
    a processing cell having an upstream interface and a downstream interface for a first direction and having an upstream interface and a downstream interface for a second direction, said processing cell for performing processing operations of the extended processor element; and
    first bypass circuitry for bypassing the processing cell in a first direction, the first bypass circuitry connected to at least one select line to receive a select signal and connected between the extended first upstream interface and said cell first upstream interface and between the extended first downstream interface and cell first downstream interface,
        wherein said first bypass circuitry is operative to connect the extended first upstream interface to the extended first downstream interface in response to an active select signal, and to connect said cell first upstream interface to the extended first upstream interface and said cell first downstream interface to the extended first downstream interface in response to an inactive select signal;
    wherein the extended first upstream and extended first downstream interfaces each include an input and output bus and the first upstream and first downstream cell interfaces each include an input and output bus; and
    second bypass circuitry for bypassing the processing cell in a second direction, the second bypass circuitry connected to at least one select line to receive a select signal and connected between an extended second upstream interface and said cell second upstream interface and between an extended second downstream interface and cell second downstream interface,
        wherein the extended second upstream and extended second downstream interfaces in the second direction each include an input and output bus and the second upstream and second downstream cell interface each includes an input and output bus, and
    wherein said first and second bypass circuitry is each operative to connect the respective upstream interface to the respective extended downstream interface in response to an active select signal, and to connect said respective cell upstream interface to the respective extended upstream interface and said respective cell downstream interface to the respective extended downstream interface in response to an inactive select signal.

42. An extended processor element for connection between an upstream processor element and a downstream processor element as recited in claim 41,
    wherein said first and second bypass circuitry each includes selection circuitry connected to the input and output busses of the extended upstream and extended downstream interfaces and the input and output busses of said cell interfaces; and wherein the selection circuitry includes a pair of unidirectional multiplexers, the first of the pair of unidirectional multiplexers having a selection output connected to the extended upstream interface output bus, the second of the pair of multiplexers having a selection output connected to the extended downstream interface output bus, one selection input of the first multiplexer connected to said cell upstream interface output bus and the other selection input of the first multiplexer connected to the extended downstream input bus, the extended downstream input bus having sufficient drive to also connect to said cell downstream input bus, and one selection input of the second multiplexer connected to said cell downstream interface output bus and the other selection input connected to the extended upstream input bus, the extended upstream input bus having sufficient drive to also connect to said cell upstream input bus.

43. An extended processor element for connection between an upstream processor element and a downstream processor element, as recited in claim 41, wherein the first direction is orthogonal to the second direction.

44. An extended processor element for connection between an upstream processor element and a downstream processor element, as recited in claim 41, wherein the input and output busses of the first bypass circuitry have a different size from the input and output busses of the second bypass circuitry.

* * * * *

UNITED STATES PATENT AND TRADEMARK OFFICE
CERTIFICATE OF CORRECTION

PATENT NO. : 6,789,212 B1  
APPLICATION NO. : 09/531911  
DATED : September 7, 2004  
INVENTOR(S) : Klingman Page 1 of 1

It is certified that error appears in the above-identified patent and that said Letters Patent is hereby corrected as shown below:

In the Specification:

On the Title page, in the Related U.S. Application Data, please delete "which is a continuation-in-part of application No. 09/339,010" and substitute therefore --and is also a continuation-in-part of application No. 09/339,010--

Col. 1, lines 10-11, please delete "which is a continuation in part of prior application Ser. No. 09/339,010" and substitute therefore --and is also a continuation in part of prior application Ser. No. 09/339,010--

Signed and Sealed this

Ninth Day of June, 2009

JOHN DOLL  
*Acting Director of the United States Patent and Trademark Office*